United States Patent
Berg et al.

(10) Patent No.: US 12,225,289 B2
(45) Date of Patent: Feb. 11, 2025

(54) PRECISION NON-CONTACT CORE IMAGING OF FIBER OPTIC ASSEMBLIES

(71) Applicant: CORNING RESEARCH & DEVELOPMENT CORPORATION, Corning, NY (US)

(72) Inventors: David Matthew Berg, Rochester, NY (US); Sterling Michael Clarke, Corning, NY (US); Stefan Wolfgang Kramel, Regensburg (DE); David Andrew Pastel, Horseheads, NY (US); Michael Brian Webb, Lindley, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/738,130

(22) Filed: May 6, 2022

(65) Prior Publication Data

US 2022/0377231 A1    Nov. 24, 2022

Related U.S. Application Data

(60) Provisional application No. 63/189,350, filed on May 17, 2021.

(51) Int. Cl.
  *G02B 6/38*    (2006.01)
  *G01M 11/00*    (2006.01)
  (Continued)

(52) U.S. Cl.
  CPC .......... *H04N 23/67* (2023.01); *G01M 11/081* (2013.01); *G01M 11/083* (2013.01);
  (Continued)

(58) Field of Classification Search
  CPC ..... G02B 6/3834; G02B 6/3843; G02B 6/385
  See application file for complete search history.

(56) References Cited

U.S. PATENT DOCUMENTS

| 4,994,679 A | 2/1991 | Esser et al. |
| 5,729,622 A | 3/1998 | Csipkes et al. |
| (Continued) | | |

FOREIGN PATENT DOCUMENTS

| DE | 19725183 A1 | 12/1998 |
| JP | 2003247806 A * | 9/2003 |
| (Continued) | | |

OTHER PUBLICATIONS

JP 2003247806 A English translation (Year: 2003).*
(Continued)

*Primary Examiner* — Charlie Y Peng

(57) ABSTRACT

A method, system, and computer program product for determining a core-to-ferrule offset of a ferrule for a fiber optic connector. A reference ferrule is physically aligned with a core imager by positioning the reference ferrule so that edges of the reference ferrule in a plurality of profile images are aligned with fiducial markers in the images. The reference ferrule is incrementally rotated about its longitudinal center access, a core image captured at each rotational angle, and a reference core-to-ferrule offset determined based on the core images. A test ferrule is physically aligned with the core imager by positioning the test ferrule so that edges of the test ferule are aligned with the edges of the reference ferrule in a plurality of profile images. The core-to-ferrule offset of the test ferrule is then determined based on an offset between the test and reference cores in a composite core image.

15 Claims, 18 Drawing Sheets

(51) Int. Cl.
  *G01M 11/08* (2006.01)
  *G02B 6/42* (2006.01)
  *G02B 7/28* (2021.01)
  *G06T 7/00* (2017.01)
  *G06T 7/66* (2017.01)
  *G06T 7/70* (2017.01)
  *H04N 23/67* (2023.01)

(52) U.S. Cl.
  CPC ......... *G01M 11/088* (2013.01); *G01M 11/33* (2013.01); *G02B 6/3843* (2013.01); *G02B 6/385* (2013.01); *G02B 6/4227* (2013.01); *G02B 7/28* (2013.01); *G06T 7/001* (2013.01); *G06T 7/66* (2017.01); *G06T 7/70* (2017.01); *G06T 2207/10148* (2013.01)

(56) References Cited

U.S. PATENT DOCUMENTS

| | | | |
|---|---|---|---|
| 5,768,409 A * | 6/1998 | Csipkes | G06T 7/0004 356/73.1 |
| 5,862,250 A | 1/1999 | Csipkes et al. | |
| 6,011,616 A | 1/2000 | Volcy et al. | |
| 7,079,743 B2 | 7/2006 | Lauzier et al. | |
| 9,612,177 B2 * | 4/2017 | Clarke | G01M 11/33 |
| 10,185,096 B2 | 1/2019 | Clarke et al. | |
| 2003/0210389 A1 * | 11/2003 | Matsumoto | G02B 6/4221 356/153 |
| 2005/0041241 A1 * | 2/2005 | Pahk | G01B 11/08 356/237.1 |
| 2005/0196115 A1 | 9/2005 | Kim et al. | |
| 2005/0211885 A1 | 9/2005 | Tobiason et al. | |
| 2006/0045458 A1 | 3/2006 | Sasaki et al. | |
| 2006/0078264 A1 * | 4/2006 | Lauzier | G01M 11/31 385/134 |
| 2013/0342852 A1 | 12/2013 | Fujimoto | |
| 2014/0327735 A1 | 11/2014 | Ruchet et al. | |
| 2015/0177097 A1 | 6/2015 | Clarke et al. | |
| 2016/0033325 A1 | 2/2016 | Fusco et al. | |
| 2018/0299632 A1 | 10/2018 | Van Baelen et al. | |

FOREIGN PATENT DOCUMENTS

| | | |
|---|---|---|
| WO | 2015/107440 A1 | 7/2015 |
| WO | 2017/140725 A1 | 8/2017 |

OTHER PUBLICATIONS

International Search Report and Written Opinion of the International Searching Authority; PCT/US2022/028287; dated Jun. 24, 2022; 17 pages; European Patent Office.

* cited by examiner

PRECISION NON-CONTACT CORE IMAGING OF FIBER OPTIC ASSEMBLIES

PRIORITY APPLICATION

This application claims the benefit of priority of U.S. Provisional Application No. 63/189,350, filed on May 17, 2021, the content of which is relied upon and incorporated herein by reference in its entirety.

TECHNICAL FIELD

This disclosure relates generally to optical connectivity, and more particularly to a method for measuring a core-to-ferrule offset in ferrule assemblies (optical fibers coupled to ferrules) included or intended to be included in fiber optic connectors.

BACKGROUND

Optical fibers are useful in a wide variety of applications, including the telecommunications industry for voice, video, and data transmissions. Benefits of optical fibers include wide bandwidth and low noise operation. In a telecommunications system that uses optical fibers, there are typically many locations where fiber optic cables containing the optical fibers connect to equipment or other fiber optic cables. To conveniently provide these connections, fiber optic connectors are often provided on the ends of fiber optic cables to non-permanently connect and disconnect optical elements in the fiber optic network.

One negative consequence of using a fiber optic connector is the introduction of an insertion loss across the optical connection, e.g., at the junction between two or more optical fibers. One common optical connection in a network is one between two mated fiber optic connectors, such as within an adapter. It should be recognized, however, that the term "optical connection" may encompass other types of junctions between optical fibers. The insertion losses in coupling two optical fibers across an optical connection are generally a function of the alignment of the optical fiber ends, the width of the gap between the ends, and the optical surface condition at the ends. To minimize insertion losses, processes have been developed for reducing misalignments of the optical fibers across the optical connection.

FIG. 1 illustrates an exemplary fiber optic connector 10 shown terminating a fiber optic cable 12 typical of that which may be found in fiber optic networks. Although the fiber optic connector 10 is shown in the form of a SC-type connector (e.g., according to IEC 61754-20: 2012), the depicted features may be applicable to different connector designs. This includes LC-type connectors (e.g., according to IEC 61754-4: 2013), for example, and other single-fiber or multi-fiber connector designs. As shown in FIG. 1, the connector 10 includes a ferrule 14 having a ferrule bore 16 ("micro-bore" or "micro-hole") configured to support an optical fiber 17 (FIG. 2) provided by the fiber optic cable 12, an end-face 18, and a cylindrically shaped outer surface 20 that defines a longitudinal center axis 22 of the ferrule 14.

The connector 10 further includes a housing 24 having a cavity 26 from which the ferrule 14 extends. The end-face 18 of ferrule 14 may project beyond a front end of the housing 24, and present the optical fiber for optical coupling with a mating component, e.g., another fiber optic connector (not shown). The ferrules 14 of two fiber optic connectors 10 may be coupled to each other using a mating sleeve or other adapter that aligns the ferrules 14. Thus, when the fiber optic connector 10 is mated with the other component, the optical fiber(s) in the ferrule 14 may be held in alignment with the optical fiber(s) of the mating ferrule to establish an optical connection.

At optical connections between fiber optic connectors, light exiting each optical fiber of one fiber optic connector (e.g., of one fiber optic cable) is introduced into a corresponding optical fiber within an adjacent fiber optic connector (e.g., of the other fiber optic cable). FIGS. 2 and 2A are schematic illustrations of an end-face view of an exemplary fiber optic connector, such as the connector 10 of FIG. 1. Bare optical fibers typically include a core 27 through which the light travels, and a cladding 28 configured to form a waveguide and minimize transmission losses through the optical fiber 17. If the optical fiber cores 27 at an interconnection between optical fibers 17 are misaligned, then transmission of an optical signal from one optical fiber 17 to the other optical fiber 17 may be inhibited, resulting in signal degradation at the interconnection. The optical fiber cores 27 must therefore be closely aligned to minimize transmission loss and optical return loss at optical connection points.

To facilitate accurate alignment between optical fiber cores 27, it is advantageous to know connector attributes such as the offset between the micro-bore 16 and the center axis 22 of each ferrule 14 being coupled. These attributes may include, for example, the eccentricity and angle of a geometric center 29 of micro-bore 16 relative to a geometric center 30 of ferrule 14 at the end-face 18. In this disclosure, the center axis 22 is assumed to extend through the geometric center 30 of ferrule 14. FIGS. 2 and 2A depict this offset in an exaggerated manner to simplify the illustrations. As shown in FIGS. 2 and 2A, the center axis 22 represents a center of the ferrule 14 that is based on the profile of the ferrule's outer surface 20. For discussion purposes, a coordinate system may be positioned at the center of the ferrule 14 that defines orthogonal axes x and y, e.g., a Cartesian coordinate system. As explained above, the micro-bore 16 is configured to support the optical fiber 17. Ideally, each micro-bore 16 would be located such that the center 29 of micro-bore 16 coincides with the center axis 22 of ferrule 14, and, therefore, the center 30 of ferrule 14 at the end-face 18. However, due to inherent tolerance variations in the materials and manufacturing processes, the centers 29 of micro-bores 16 are typically offset from the ferrule center axis 22 by some amount. That is, there is typically an error in concentricity, resulting in micro-bore-to-ferrule eccentricity.

The optical fiber 17 is configured to be positioned in the micro-bore 16 and secured within the micro-bore 16 using a suitable adhesive or bonding agent 31. The micro-bore 16 is typically oversized relative to the optical fiber 17. This can result in a geometric center 32 of optical fiber 17 being offset from the center 29 of micro-bore 16 by some amount, referred to as the fiber-to-micro-bore eccentricity. Moreover, due to inherent tolerance variations in the materials and processes used to manufacture the optical fiber 17, a geometric center 33 of the core 27 of optical fiber 17 is typically offset from the center 32 of optical fiber 17 (which is defined by the outer surface of the cladding 28) by some amount. Thus, there is also typically a fiber core eccentricity.

As described above, the position of the core 27 of optical fiber 17 relative to the geometric center 30 of ferrule 14 may have a wide range of variance. That variation is influenced at least in part by: i) the position of the micro-bore 16 within the ferrule 14; ii) the position of the optical fiber 17 within the micro-bore 16; and iii) the position of the core 27 within the optical fiber 17. The result is typically a core-to-ferrule offset, which may be expressed as a vector in the Cartesian coordinate system. For example, a core-to-ferrule offset vector may be expressed a vector ($\delta$, $\theta$) using polar coordinates, where $\delta$ is a magnitude of the offset (measured between the center 33 of the core 27 and the center 29 of the ferrule 14) and $\theta$ is a direction of the offset measured relative to the +x axis. The axes of the Cartesian coordinate system—and, therefore, the core-to-ferrule offset vector—are defined in relation to a reference marker/rotational reference associated with the ferrule 14 directly or indirectly. For example, the ferrule 14 itself may include an index mark on the outer surface 20 such that the directional component of the core-to-ferrule offset vector can be defined in relation to the index mark. Alternatively, the ferrule 14 may have a fixed rotational position relative to other components of the connector 10, such as the housing 24, thereby allowing a geometric feature or index mark on the other connector component to serve as a reference marker for the rotational position of the ferrule 14.

One challenge for reducing insertion losses is to locate the center 33 of the core 17 of optical fiber 17 as close as possible to the center axis 22 of ferrule 14 given the variations present in current materials and manufacturing techniques. In many cases, the center axis 22 operates as the mating location of the ferrule 14, and losses may be reduced by minimizing the offset between the center 33 of the core 27 of optical fiber 17 and the center axis 22 at the end-face 18 of the ferrule 14. This offset is referred to as the core-to-ferrule offset, and indicates the deviation in the position of the core 17 of optical fiber 17 from its optimal position, i.e., aligned with the center axis 22 of ferrule 14.

Known methods of determining core-to-ferrule offsets involve rotating a measurement device around the center axis 22 of ferrule 16, and sensing a time/rotation varying signal that indicates a certain level of core-to-ferrule eccentricity. However, enabling the device to rotate about the ferrule 16 in precise alignment with the center axis 22 adds significant cost and complexity to the measurement system. In addition, the need for physical rotation about the ferrule 16 adds a significant amount of time to each measurement, making these types of measurements unsuitable for a manufacturing environment in which a high throughput is desirable.

Thus, there is a need in the fiber optic industry for improved methods of determining core-to-ferrule offsets in fiber optic connectors. More particularly, there is a need for methods of accurately determining the ferrule-to-core offset in individual connectors that do not require rotation of the connector.

SUMMARY

In an embodiment, an improved method of determining a core-to-ferrule offset vector of a test ferrule is disclosed. The disclosed method includes capturing a plurality of images of a reference ferrule including a first core image and a first plurality of profile images, the first core image including a first image element corresponding to a core of an optical fiber that is positioned in the reference ferrule, and each profile image of the first plurality of profile images including a second image element corresponding to an outer surface of the reference ferrule. The disclosed method further includes capturing a plurality of images of the test ferrule including a second core image and a second plurality of profile images, the second core image including a third image element corresponding to a core of an optical fiber that is positioned in the test ferrule, and each profile image of the second plurality of profile images including a fourth image element corresponding to the outer surface of the test ferrule. The disclosed method further includes positioning the test ferrule so that the fourth image element in each of the second plurality of profile images aligns with the second image element in a respective one of the first plurality of profile images, and determining the core-to-ferrule offset vector of the test ferrule based on a location of the third image element in the second core image relative to the first image element in the first core image.

In an aspect of the disclosed method, determining the core-to-ferrule offset vector of the test ferrule may include determining a core-to-core vector connecting the location of the first image element in the first core image to the location of the third image element in the second core image, and subtracting the core-to-ferrule offset vector of the reference ferrule from the core-to-core vector to generate the core-to-ferrule offset vector of the test ferrule.

In another aspect of the disclosed method, the reference ferrule may have a longitudinal center axis, the first core image may be one of a plurality of first core images, and the core-to-ferrule offset vector of the reference ferrule may be determined by incrementally rotating the reference ferrule around the longitudinal center axis to occupy a plurality of predetermined angular positions. At each angular position, the disclosed method may capture a third plurality of profile images of the reference ferrule each including a fifth image element corresponding to the outer surface of the reference ferrule, position the reference ferrule so that the fifth image element in each of the third plurality of profile images aligns with the second image element in a respective profile image of the first plurality of profile images, and capture the first core image of the reference ferrule, the first core image including the first image element corresponding to the core of the optical fiber that is positioned in the reference ferrule. The disclosed method may further include superimposing each of the first image elements into a composite (for convenience, referred to in this disclosure as "composite core image" even though it is the positions of the first image elements made into the composite rather than first core images themselves), and determining the core-to-ferrule offset vector of the reference ferrule based on the location of each of the plurality of first image elements in the composite core image.

In another aspect of the disclosed method, determining the core-to-ferrule offset vector of the reference ferrule based on the location of each of the plurality of first image elements may include identifying the location of a geometric center of the plurality of first image elements, and determining the core-to-ferrule offset vector of the reference ferrule as a vector connecting the geometric center of the plurality of first image elements to the first image element corresponding to the first plurality of profile images.

In another aspect of the disclosed method, each image may be captured by an image sensor having a plurality of pixels arranged in a two-dimensional array, and the location of each image element may be defined by pixel coordinates of at least one of the pixels in the two-dimensional array.

In another aspect of the disclosed method, prior to capturing one or both of the first core image and the second core image, the disclosed method may further include, for each of a plurality of lens focus settings, capturing a third core image including the third image element and determining a width of the third image element of the third core image. The term "lens focus setting" in this disclosure refers to a position of a lens that has a focus. Different lens focus settings refers to the lens being moved to different positions such that the focus position of the lens is different as well. To this end, alternative terms for "lens focus setting" include "lens position setting," "lens focus position," or "lens position with corresponding focus". The disclosed method may further include identifying the lens focus setting having a smallest width of the third image element, and using the lens focus setting having the smallest width to capture one or both of the first core image and the second core image.

In another aspect of the disclosed method, the disclosed method may further include, prior to capturing an initial third core image, positioning the test ferrule to achieve a rough focus of the second image element in the initial third core image.

In another aspect of the disclosed method, identifying the lens focus setting having the smallest width of the third image element may include plotting the width of each third image element verses lens focus setting, fitting the plotted widths to a polynomial curve, and identifying a minimum of the polynomial curve as the lens focus setting having the smallest width.

In another aspect of the disclosed method, the polynomial curve may be a parabola.

In another aspect of the disclosed method, the disclosed method may further include determining a profile image displacement between the fourth image element in each of the second plurality of profile images and the second image element in the respective one of the first plurality of profile images, mapping the profile image displacement to a core image displacement in the second core image, subtracting the core image displacement from the location of third image element to generate a corrected location of the third image element, and moving the third image element in the second core image to the corrected location.

In another aspect of the disclosed method, the disclosed method may further include extracting edge data associated with the fourth image element from one or more of the second plurality of profile images, fitting a curve to the edge data, subtracting the fitted curve from the edge data to generate a residual curve, and determining the test ferrule is compromised if a point on the residual curve exceeds a predetermined threshold.

In another aspect of the disclosed method, the fitted curve may be one of a linear curve or a polynomial curve.

In another aspect of the disclosed method, the edge data may include coordinates of a plurality of pixels in the image that define an edge associated with the outer surface of the test ferrule.

In another aspect of the disclosed method, extracting the edge data may include convolving the profile image with a derivative of a Gaussian function to generate a convolved profile image, identifying a peak value of the convolved profile image, and determining an edge is located at the peak value.

In another embodiment, an improved system for determining the core-to-ferrule offset vector of the test ferrule is disclosed. The disclosed system includes a plurality of apex imagers arranged so that each apex imager captures a profile image from a different angle around a measurement region, a core imager, a positioner, one or more processors in communication with the apex imagers, the core imager, and the positioner, and a memory coupled to the one or more processors and including program code. When executed by the one or more processors, the program code causes the disclosed system to capture the plurality of images of the reference ferrule including the first core image and the first plurality of profile images, the first core image including the first image element corresponding to the core of the optical fiber that is positioned in the reference ferrule, and each profile image of the first plurality of profile images including the second image element corresponding to the outer surface of the reference ferrule. The program code further causes the disclosed system to capture the plurality of images of the test ferrule including the second core image and the second plurality of profile images, the second core image including the third image element corresponding to the core of the optical fiber that is positioned in the test ferrule, and each profile image of the second plurality of profile images including the fourth image element corresponding to the outer surface of the test ferrule. The program code further causes the disclosed system to position the test ferrule so that the fourth image element in each of the second plurality of profile images aligns with the second image element in the respective one of the first plurality of profile images, and determine the core-to-ferrule offset vector of the test ferrule based on the location of the third image element in the second core image relative to the first image element in the first core image.

In an aspect of the disclosed system, the program code may cause the disclosed system to determine the core-to-ferrule offset vector of the test ferrule by determining the core-to-core vector connecting the location of the first image element in the first core image to the location of the third image element in the second core image, and subtracting the core-to-ferrule offset vector of the reference ferrule from the core-to-core vector to generate the core-to-ferrule offset vector of the test ferrule.

In another aspect of the disclosed system, the first core image may be one of the plurality of first core images, and the program code may cause the disclosed system to determine the core-to-ferrule offset vector of the reference ferrule by, while the reference ferrule is positioned in each of the plurality of angular positions about the longitudinal center axis, capturing the third plurality of profile images of the reference ferrule each including the fifth image element corresponding to the outer surface of the reference ferrule, positioning the reference ferrule so that the fifth image element in each of the third plurality of profile images aligns with the second image element in the respective profile image of the first plurality of profile images, and capturing the first core image of the reference ferrule, the first core image including the first image element corresponding to the core of the optical fiber that is positioned in the reference ferrule. The program code may further cause the disclosed system to determine the core-to-ferrule offset vector of the reference ferrule by superimposing each of the first image elements into the composite core image, and determining the core-to-ferrule offset vector of the reference ferrule based on the location of each of the plurality of first image elements in the composite core image.

In another aspect of the disclosed system, the program code may cause the disclosed system to determine the core-to-ferrule offset vector of the reference ferrule based on the location of each of the plurality of first image elements by identifying the location of the geometric center of the plurality of first image elements, and determining the core-to-ferrule offset vector of the reference ferrule as the vector connecting the geometric center of the plurality of first image elements to the first image element corresponding to the first plurality of profile images.

In another aspect of the disclosed system, each image may be captured by the image sensor having the plurality of pixels arranged in the two-dimensional array, and the location of each image element may be defined by pixel coordinates of at least one of the pixels in the two-dimensional array.

In another aspect of the disclosed system, the core imager may include the lens having the lens focus setting, and prior to causing the disclosed system to capture one or both of the first core image and the second core image, the program code may further cause the disclosed system to, for each of the plurality of lens focus settings, capture the third core image including the third image element, and determine the width of the third image element of the third core image. The program code may then further cause the disclosed system to identify the lens focus setting having the smallest width of the third image element, and set the lens focus setting to the lens focus setting having the smallest width before causing the core imager to capture one or both of the first core image and the second core image.

In another aspect of the disclosed system, prior to causing the disclosed system to capture the initial third core image, the program code may further cause the disclosed system to position the test ferrule to achieve the rough focus of the second image element in the initial third core image.

In another aspect of the disclosed system, the program code may cause the disclosed system to identify the lens focus setting having the smallest width of the third image element by plotting the width of each third image element verses lens focus setting, fitting the plotted widths to the polynomial curve, and identifying the minimum of the polynomial curve as the lens focus setting having the smallest width.

In another aspect of the disclosed system, the polynomial curve may be a parabola.

In another aspect of the disclosed system, the program code may further cause the disclosed system to determine a profile image displacement between the fourth image element in each of the second plurality of profile images and the second image element in the respective one of the first plurality of profile images, map the profile image displacement to the core image displacement in the second core image, subtract the core image displacement from the location of third image element to generate the corrected location of the third image element, and move the third image element in the second core image to the corrected location.

In another aspect of the disclosed system, the program code may further cause the disclosed system to extract the edge data associated with the fourth image element from the one or more of the second plurality of profile images, fit the curve to the edge data, subtract the fitted curve from the edge data to generate the residual curve, and determine the test ferrule is compromised if the point on the residual curve exceeds the predetermined threshold.

In another aspect of the disclosed system, the fitted curve may be one of the linear curve or the polynomial curve.

In another aspect of the disclosed system, the edge data may include coordinates of the plurality of pixels in the image that define the edge associated with the outer surface of the test ferrule.

In another aspect of the disclosed system, the program code may cause the disclosed system to extract the edge data by convolving the profile image with the derivative of the Gaussian function to generate the convolved profile image, identifying the peak value of the convolved profile image, and determining the edge is located at the peak value.

In another embodiment, an improved computer program product for determining the core-to-ferrule offset vector of the test ferrule is disclosed. The disclosed computer program product includes a non-transitory computer-readable storage medium, and program code stored on the non-transitory computer-readable storage medium. When executed by one or more processors, the program code causes the one or more processors to capture the plurality of images of the reference ferrule including the first core image and the first plurality of profile images, the first core image including the first image element corresponding to the core of the optical fiber that is positioned in the reference ferrule, and each profile image of the first plurality of profile images including the second image element corresponding to the outer surface of the reference ferrule. The program code further causes the one or more processors to capture the plurality of images of the test ferrule including the second core image and the second plurality of profile images, the second core image including the third image element corresponding to the core of the optical fiber that is positioned in the test ferrule, and each profile image of the second plurality of profile images including the fourth image element corresponding to the outer surface of the test ferrule. The program code further causes the one or more processors to position the test ferrule so that the fourth image element in each of the second plurality of profile images aligns with the second image element in the respective one of the first plurality of profile images, and determine the core-to-ferrule offset vector of the test ferrule based on the location of the third image element in the second core image relative to the first image element in the first core image.

In another embodiment, an improved method of determining a core-to-ferrule offset vector of a reference ferrule is disclosed. The disclosed method includes incrementally rotating the reference ferrule around a longitudinal center axis thereof so that the reference ferrule occupies a plurality of predetermined angular positions, capturing a core image of the reference ferrule at each angular position, each core image including a first image element corresponding to a core of an optical fiber that is positioned in the reference ferrule, superimposing the first image element from each core image onto a composite core image, and determining the core-to-ferrule offset vector of the reference ferrule based on locations of the plurality of first image elements in the composite core image.

In an aspect of the disclosed method, determining the core-to-ferrule offset vector of the reference ferrule may include identifying the location of a geometric center of the plurality of first image elements, and determining the core-to-ferrule offset vector of the reference ferrule as a vector connecting the geometric center of the plurality of first image elements to the first image element of the composite core image.

In another aspect of the disclosed method, the first image element may be a core disk, and determining the location of the first image element may include fitting a two-dimensional Gaussian function to the core disk, determining a location of a peak of the fitted two-dimensional Gaussian function in the core image, and defining the location of the first image element as pixel coordinates of the peak of the fitted two-dimensional Gaussian function in the core image.

In another aspect of the disclosed method, the disclosed method may further include physically aligning the reference ferrule by capturing a plurality of profile images of the reference ferrule, each profile image including a second image element corresponding to an outer surface of the reference ferrule, and positioning the reference ferrule so that the second image element in each of the plurality of profile images aligns with a respective fiducial marker superimposed on the profile image.

In another aspect of the disclosed method, the reference ferrule may be physically aligned after each incremental rotation, and the disclosed method may further include determining a profile image displacement between the second image element and the respective fiducial marker in one or more of the profile images, mapping the profile image displacement to a core image displacement, subtracting the core image displacement from the location of first image element to generate a corrected location of the first image element, and moving the first image element in the core image to the corrected location.

In another aspect of the disclosed method, the fiducial marker may be associated with the second image element of a profile image from a previous angular position.

In another embodiment, an improved system for determining the core-to-ferrule offset vector of the reference ferrule is disclosed. The disclosed system includes a core imager, one or more processors in communication with the core imager, and a memory coupled to the one or more processors and including program code. When executed by the one or more processors, the program code causes the disclosed system to, while the reference ferrule is positioned in each of the plurality of predetermined angular positions about the longitudinal center axis of the ferrule, capture the core image of the reference ferrule including a first image element corresponding to a core of an optical fiber that is positioned in the reference ferrule. The program code further causes the disclosed system to superimpose the first image element from each core image onto the composite core image, and determine the core-to-ferrule offset vector of the reference ferrule based on locations of the plurality of first image elements in the composite core image.

In an aspect of the disclosed system, the program code may cause the disclosed system to determine the core-to-ferrule offset vector of the reference ferrule by identifying the location of the geometric center of the plurality of first image elements, and determining the core-to-ferrule offset vector of the reference ferrule as the vector connecting the geometric center of the plurality of first image elements to the first image element of the composite core image.

In another aspect of the disclosed system, the first image element may be the core disk, and the program code may cause the disclosed system to determine the location of the first image element by fitting the two-dimensional Gaussian function to the core disk, determining the location of the peak of the fitted two-dimensional Gaussian function in the core image, and defining the location of the first image element as the pixel coordinates of the peak of the fitted two-dimensional Gaussian function in the core image.

In another aspect of the disclosed system, the disclosed system may further include a positioner, and a plurality of apex imagers arranged so that each apex imager captures a profile image from a different angle about the longitudinal center axis. In accordance with this aspect, the program code may further cause the disclosed system to physically align the reference ferrule by capturing the plurality of profile images of the reference ferrule, each profile image including the second image element corresponding to the outer surface of the reference ferrule, and positioning the reference ferrule so that the second image element in each of the plurality of profile images aligns with the respective fiducial marker superimposed on the profile image.

In another aspect of the disclosed system, the reference ferrule may be physically aligned after each incremental rotation, and the program code may further cause the disclosed system to determine the profile image displacement between the second image element and the respective fiducial marker in one or more of the profile images, map the profile image displacement to the core image displacement, subtract the core image displacement from the location of first image element to generate the corrected location of the first image element, and move the first image element in the core image to the corrected location.

In another aspect of the disclosed system, the fiducial marker may be associated with the second image element of the profile image from the previous angular position.

In another embodiment, an improved computer program product for determining the core-to-ferrule offset vector of the reference ferrule is disclosed. The disclosed computer program product includes a non-transitory computer-readable storage medium, and program code stored on the non-transitory computer-readable storage medium. When executed by one or more processors, the program code causes the one or more processors to capture the plurality of images of the reference ferrule including the first core image, and the first plurality of profile images, the first core image including the first image element corresponding to the core of the optical fiber that is positioned in the reference ferrule, and each profile image of the first plurality of profile images including the second image element corresponding to the outer surface of the reference ferrule. The program code further causes the one or more processors to capture the plurality of images of the test ferrule including the second core image and the second plurality of profile images, the second core image including the third image element corresponding to the core of the optical fiber that is positioned in the test ferrule, and each profile image of the second plurality of profile images including the fourth image element corresponding to the outer surface of the test ferrule. The program code further causes the one or more processors to position the test ferrule so that the fourth image element in each of the second plurality of profile images aligns with the second image element in the respective one of the first plurality of profile images, and determine the core-to-ferrule offset vector of the test ferrule based on the location of the third image element in the second core image relative to the first image element in the first core image.

In another embodiment, an improved method of focusing the core image of a test ferrule that has an optical fiber coupled thereto, wherein the optical fiber includes a core for the core image, is disclosed. The disclosed method includes positioning the test ferrule to achieve a rough focus of an image element in a core image, and for each of a plurality of lens focus settings, capturing another core image including the image element and determining a width of the image element in the core image. The disclosed method further includes identifying the lens focus setting having a smallest width of the image element, and setting a position of the lens to the lens focus setting having the smallest width.

In an aspect of the disclosed method, identifying the lens focus setting having the smallest width of the image element may include plotting the width of each image element verses the lens focus setting, fitting the plotted widths to a curve, and identifying a minimum of the I curve as the lens focus setting having the smallest width.

In another aspect of the disclosed method, the curve may be a polynomial curve.

In another aspect of the disclosed method, the curve may be a parabola.

In another aspect of the disclosed method, determining the width of the image element may include fitting a Gaussian function to the image element, determining a standard deviation of the fitted Gaussian function, and determining the width of the image element based on the standard deviation.

In another aspect of the disclosed method, the width of the image element may be twice the standard deviation.

In another aspect of the disclosed method, the disclosed method may further include comparing the smallest width of the image element to a maximum allowable width, repositioning the test ferrule in response to the smallest width of the image element exceeding the maximum allowable width, and repeating the capturing, the determining, the identifying, and the setting steps.

In another embodiment, an improved system for focusing the core image of the test ferrule that has the optical fiber coupled thereto, wherein the optical fiber includes the core for the core image, is disclosed. The disclosed system includes a core imager including a lens having a lens focus setting, a positioner, one or more processors in communication with the core imager and the positioner, and a memory coupled to the one or more processors and including program code. When executed by the one or more processors, the program code causes the disclosed system to position the test ferrule to achieve the rough focus of the image element in the core image, and for each of the plurality of lens focus settings, capture another core image including the image element and determine the width of the image element of the core image. The program code further causes the disclosed system to identify the lens focus setting having the smallest width of the image element, and set the position of the lens to the lens focus setting having the smallest width.

In an aspect of the disclosed system, the program code may cause the disclosed system to identify the lens focus setting having the smallest width of the image element by plotting the width of each image element verses the lens focus setting, fitting the plotted widths to the curve, and identifying the minimum of the curve as the lens focus setting having the smallest width.

In another aspect of the disclosed system, the curve may be the polynomial curve.

In another aspect of the disclosed system, the polynomial curve may be the parabola.

In another aspect of the disclosed system, the program code may cause the disclosed system to determine the width of the image element by fitting the Gaussian function to the image element, determining the standard deviation of the fitted Gaussian function, and determining the width of the image element based on the standard deviation.

In another aspect of the disclosed system, the width of the image element may be twice the standard deviation.

In another aspect of the disclosed system, the program code may further cause the disclosed system to compare the smallest width of the image element to the maximum allowable width, and in response to the smallest width of the image element exceeding the maximum allowable width, reposition the test ferrule and repeat the capturing, the determining, the identifying, and the setting steps.

In another embodiment, an improved computer program product for focusing the core image of the test ferrule that has the optical fiber coupled thereto, wherein the optical fiber includes the core for the core image, is disclosed. The computer program product includes a non-transitory computer-readable storage medium, and program code stored on the non-transitory computer-readable storage medium. The program code, when executed by one or more processors, causes the one or more processors to position the test ferrule to achieve the rough focus of the image element in the core image, and for each of the plurality of lens focus settings, capture another core image including the image element and determine the width of the image element of the core image. The program code further causes the one or more processors to identify the lens focus setting having the smallest width of the image element, and set the position of the lens to the lens focus setting having the smallest width.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1:
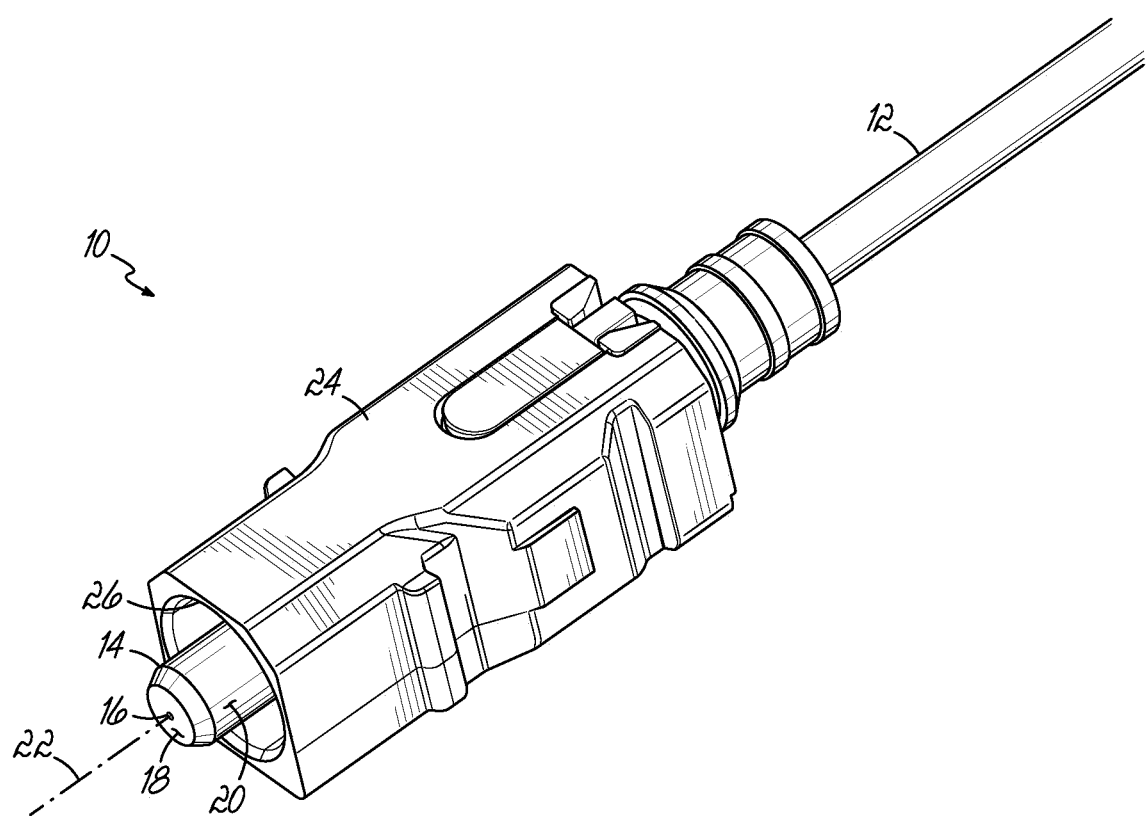
FIG. 1 is a perspective view of an exemplary fiber optic connector.

Various embodiments will be further clarified by examples in the description below. In general, the description relates to methods, systems, and software products for measuring core-to-ferrule offsets in fiber optic connectors. These methods, systems, and software products enable image based measurements of core-to-ferrule offsets that use an "optical collet" feature to physically align the device under test. Once physical alignment is obtained, a "cylindrical optical gauge block" feature may be used to provide a precise and repeatable core-to-ferrule measurement. In the below description, the term "position" generally refers to both the position and orientation of an object in a three-dimensional space, and the term "location" generally refers to both the location and orientation of an image element in an image.

Additionally, in the description below and the claims that follow, the term "core-to-ferrule offset" or "core-to-ferrule eccentricity" refers to a positional relationship between a center of a core of an optical fiber relative to a center of a ferrule that holds the optical fiber. The ferrule terminates the optical fiber, forming a ferrule assembly, and such ferrule assembly may be part of a fiber optic connector subassembly or fully assembled fiber optic connector. For convenience, rather than stating it is the ferrule assembly having a core-to-ferrule offset or core-to-ferrule eccentricity, the description and claims simply refer to the ferrule having a core-to-ferrule offset or core-to-ferrule eccentricity. The reference to "core-to-ferrule" makes it clear that the optical fiber is being considered with the ferrule, and that the positional relationship is not merely something associated with the ferrule alone (e.g., in contrast to a micro-bore offset/eccentricity of the ferrule).

A mechanical gauge block is a measurement device with a precise, accurate thicknesses. As an example of how a gauge block works, imagine measuring a 5.01 mm gap to an accuracy of 1.0 µm using an imaging system. By inserting a 5.00 mm gauge block into the 5.01 mm gap, the imaging system only needs to measure the remaining 10.0 µm of the total gap to an accuracy of 1.0 µm. Trying to measure a 5.01 mm gap to 1.0 µm would require an accuracy and resolution of one part in 5.00×1,000=5,000. However, by inserting the gauge block, the imaging system only needs to measure a 0.01 mm gap to one part in 0.01×1,000=10. Thus, use of the gauge block reduces the precision required by 5,000/10=500 times as compared to direct measurement.

To extend the above concept to a core-to-ferrule measurement, the above gauge block must be transformed into a new type of gauge block that provides the same type of measurement. As described in detail below, this problem is solved using a reference ferrule that terminates an optical fiber, with a core of the optical fiber having a known positional relationship relative to a longitudinal center axis of the ferrule. The reference ferrule serves as a cylindrical optical gauge block for a test ferrule that terminates a different optical fiber. The ferrule assembly comprising the test ferrule and optical fiber may be referred to as a "device under test" or "DUT". The edges of the test ferrule may be aligned in a plurality of images such that both the test ferrule and reference ferrule are superimposed into the same position (x, y, z) and orientation ($\alpha$, $\beta$, $\gamma$) (referred to collectively as "position") in a common three-dimensional reference frame (x, y, z, $\alpha$, $\beta$, $\gamma$). Once this physical alignment is achieved, the core-to-ferrule offset vector of the test ferrule may be determined based on the difference in core position between the test and reference ferrules. The core imager resolves the shift in core position between the reference and test ferrules, which has a range on the order of 1 µm. Resolving a 1 µm shift to 10 nm only requires a resolution of one part in 100. In contrast, measuring the core location relative to the outer surface of the ferrule would require a resolution of one part in 2.5 mm/10 nm=250,000, which is well beyond what is possible with known imaging systems. Advantageously, using the cylindrical gauge block reduces a one part in 250,000 resolution problem to a one part in 100 resolution problem.

The optical gauge block feature involves calibrating the measurement system using a reference ferrule. To this end, the reference ferrule may be positioned in the measurement system, and a plurality of reference images of the ferrule may be captured synchronously within a narrow window of time, e.g., simultaneously. The reference images may include profile images of the reference ferrule captured from a plurality of angles, and a core image. Simultaneous capturing of the images may enable collection of images over many seconds, which may allow averaging of results to achieve high precision, e.g., core-to-ferrule tracking to an accuracy on the order of 10 nm. Simultaneous capture may also allow vibration and thermal drifts to be rejected because shifts in the location of image elements in the core image and profile images due to these effects are common-mode movement. The rejection of common-mode location errors may allow relaxed requirements on the exact positioning of the ferrule as compared to systems that rely exclusively on precise physical positioning of reference and test ferrules.

The optical collet feature positions subsequently measured test ferrules so that image elements (e.g., edges of the test ferrule) in measurement profile images are aligned with image elements (e.g., edges of the reference ferrule) in respective reference profile images. The optical collet feature thereby physically aligns (within the limits of a positioner) the longitudinal center axis and end-face of the test ferrule with the position previously occupied by the longitudinal center axis and end-face of the reference ferrule. Once the test ferrule is physically aligned, the measurement system may execute a final-focus process for one or more of the imagers (e.g., the core imager), and then simultaneously capture measurement images of the test ferrule. The location of the core of the test ferrule in the measurement core image may be corrected based on residual differences between the locations and orientations (referred to collectively as "locations") of the image elements in the measurement profile images and the locations of the image elements in the reference profile images.

The corrected location of the core in the measurement core image may then be compared to the location of the core in the reference core image. The core-to-ferrule offset vector (e.g., offset distance and angle from the central axis) of the test ferrule can then be determined by comparing the location of the core in the measurement core image to the location of the core in the reference core image. The reference ferrule thereby provides an "optical gauge block" that allows precise measurement of the core-to-ferrule offset vector in the test ferrule. The optical collet and optical gauge block features collectively enable the core-to-ferrule offset vector of a test ferrule to be determined precisely (e.g., to within 10 nm) without requiring rotation of the test ferrule.

Reference can be made to the background section above and the description of FIG. 1 for an example ferrule (and connector) to which this description may apply. Indeed, various references to the connector 10 and ferrule 14 are made in the description that follows. It will be appreciated, however, that the description may apply to other ferrule and/or connector types.

Figure 3:
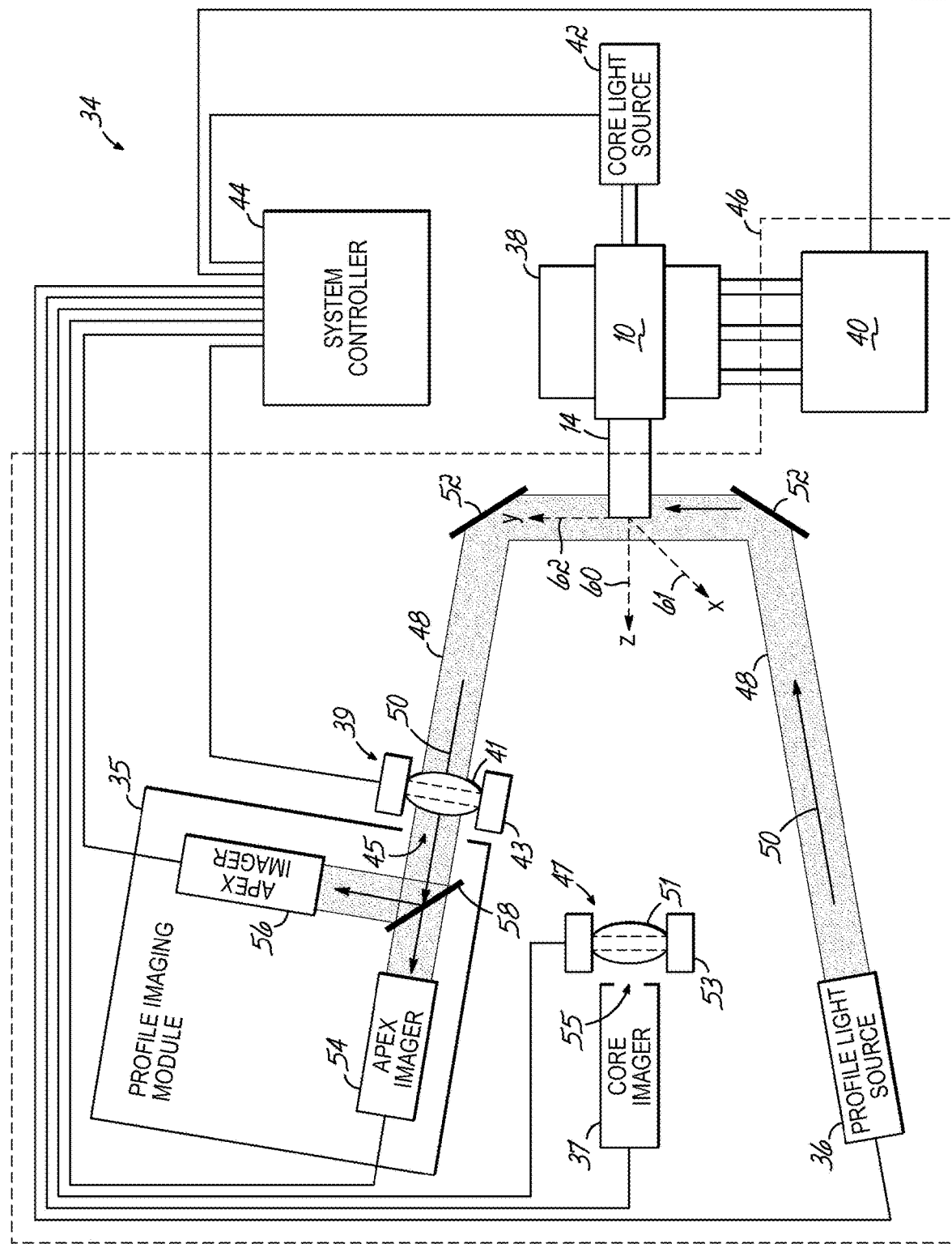
FIG. 3 is a schematic view of an exemplary measurement system that may be used to determine a core-to-ferrule offset of a ferrule of the connector shown in FIG. 1.
Figure 4:
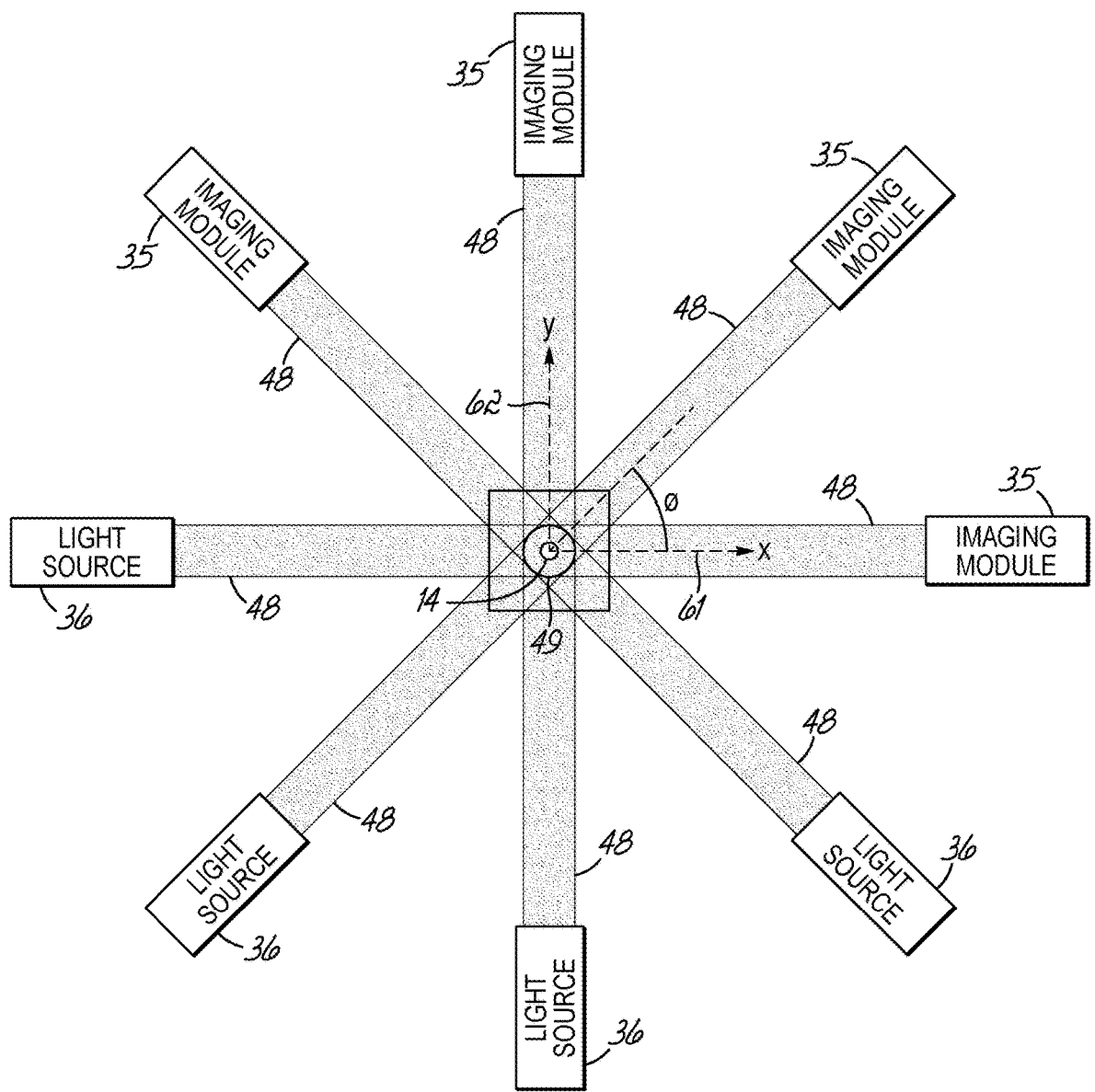
FIG. 4 is a schematic view showing an arrangement of profile imaging modules and light sources of the measurement system of FIG. 3.

With this in mind, FIGS. 3 and 4 depict an exemplary measurement system 34 that includes a plurality of profile imaging modules 35, a plurality of profile light sources 36, a core imager 37, a measurement port 38, a positioner 40, a core light source 42, and a system controller 44. The profile imaging modules 35, profile light sources 36, core imager 37, and positioner 40 may be mounted to a common support assembly 46 that maintains these components in a fixed position relative to each other.

Each profile imaging module 35 may include a profile imaging objective assembly 39 having a profile imaging objective 41 and a profile imaging objective focusing mechanism 43 configured to focus a profile image on an optical sensor of each apex imager 54, 56. Each profile imaging module 35 may also include one or more aperture stops 45 each located between at least one of the apex imagers 54, 56 and the profile imaging objective 41. The core imager 37 may include a core imaging objective assembly 47 having a core imaging objective 51 and a core imaging objective focusing mechanism 53 configured to focus a core image on an optical sensor of the core imager 37. The core imager 37 may also include an aperture stop 55 located between the image sensor and the core imaging objective 51. Each aperture stop 45, 55 may be configured to limit the amount of light that passes through to their respective image sensor, and may include a fixed or adjustable diaphragm that defines the aperture of the aperture stop.

The measurement port 38 may be configured to receive a fiber optic connector 10 (such as that shown in FIG. 1) including a ferrule 14, and may be coupled to the common support assembly 46 by the positioner 40. In alternative embodiments, the measurement port 38 may be configured to receive a sub-assembly of a fiber optic connector, such as a ferrule assembly that consists solely of or includes the ferrule 14 with the optical fiber secured thereto (and potentially a ferrule holder or "hub" received over a rear portion of the ferrule 14). The system controller 44 may be operatively coupled to one or more of the profile imaging modules 35, profile light sources 36, core imager 37, positioner 40, core light source 42, profile objective focusing mechanism 43, core objective focusing mechanism 53, or individual components thereof, in order to control operation of the measurement system 34.

As best shown by FIG. 4, each profile imaging module 35 may be optically aligned with a corresponding profile light source 36 along an optical path 48. Each optical path 48 may pass by the measurement port 38 (FIG. 3) so that the ferrule 14 is optically positioned between each profile imaging module 35 and its respective profile light source 36. Thus, the ferrule 14 may be illuminated from behind (or "backlit") by each profile light source 36 from the perspective of the profile imaging module 35 at the other end of the optical path 48.

Although the exemplary embodiment depicted includes four profile imaging modules 35, it should be understood that other numbers of profile imaging modules 35 may be used. Larger numbers of profile imaging modules 35 may enable increased spatial averaging, which may reduce sensitivity of the measurement to local surface non-uniformities of the ferrule 14. Although there are no specific limits on the number of profile imaging modules 35 and light sources 36, typical implementations may include from two to sixteen pairs of profile imaging modules 35 and light sources 36, with systems having eight pairs of profile imaging modules 35 and light sources 36 providing a good tradeoff between measurement accuracy and system size and cost.

The profile imaging modules 35 may be arranged circumferentially around the measurement port 38 so that each optical path 48 intersects the ferrule 14 of connector 10 from a different angle. The intersecting optical paths 48 may define a measurement region 49 into which the ferrule 14 is positioned. The angular channel spacing may be even, with each optical path 48 having a channel angle $\gamma_{ch}=i\times\varphi$, where i is an integer from 0 to (m−1), m is the total number of optical paths 48, and $m\times\varphi=2\pi$ radians.

Each profile light source 36 may include one or more illuminants (e.g., incandescent or florescent bulbs, light emitting diodes (LED), etc.) and optical elements (e.g., lenses, diaphragms, diffusers, etc.) configured to emit light 50 (FIG. 3) that provides even illumination (e.g., Kohler illumination) at the ferrule 14. The circumferential arrangement of the profile imaging modules 35 may enable measurement of a cylindrical form factor object, e.g., the ferrule 14. The illumination rays may be directed across the ferrule 14 so that the rays are intercepted tangentially by the outer surface 20 (FIG. 1) thereof.

As best shown by FIG. 3, the optical path 48 may be folded using one or more reflectors 52, e.g., mirrors, prisms, or the like. The reflectors 52 may allow flexible placement of the profile imaging modules 35 and light sources 36 while maintaining a generally orthogonal angle of incidence between the rays of light 50 and the center axis of ferrule 14. Because the reflectors 52 relay the ferrule image to the imaging objectives, small amounts of movement by the reflectors 52 (e.g., microns) may result in relatively large shifts in the image at the apex imagers 54, 56 (e.g., tens of microns). Although the differential nature of the profile measurements may mitigate this shift, any shift could have the potential to degrade the precision of measurements made by the measurement system 34. To mitigate the potential for movement, the reflectors 52 may be held in a monolithic reference ring (not shown) that provides an accurate and stabile mounting point for each reflector 52.

Each profile imaging module 35 may include at least one imaging device (e.g., two apex imagers 54, 56), and a beam splitter 58. The beam splitter 58 may be used to split beams of light received by the profile imaging module 35 into separate beams, one for each apex imager 54, 56. The beam splitter 58 may thereby facilitate packaging of the apex imagers 54, 56 in the profile imaging module 35, e.g., by allowing the apex imagers 54, 56 to be oriented at right angles and offset spatially from each other.

The profile imaging modules 35 may be arranged in a frustoconical shape with cylindrical symmetry about the z-axis 60. This symmetric frustoconical arrangement may provide a compact and stable measurement system 34 with a minimum number of reflections between each profile imaging module 35 and its respective profile light source 36. There may be one or more design drivers that impact the frustoconical shape. For example, it may be desirable for the diameter of the narrow end of the frustoconical arrangement where the ferrule is measured to be as small as possible to facilitate integration of the measurement system 34 into a production line. However, a competing design driver may be for the diameter of the narrow end of the frustoconical arrangement to also be large enough to provide space for the core imaging optics, e.g., the objective assembly 39 or reflectors 52. The diameter of the wide end of the frustoconical arrangement may need to be large enough to accommodate the desired number of profile imaging modules 35. The length of the frustoconical shape may determine the length of the optical path 48, which may in turn determine the magnification of the apex imagers 54. A frustoconical arrangement may allow each optical path 48 to include a minimum number of reflectors 52 (e.g., one reflector) for maximum image stability. Along with the desired magnification, the above design drivers may be used to define the geometry of the measurement system 34.

The inside diameter of the narrow end of the frustoconical arrangement may define the space available for profile light source and profile imaging module optical components, e.g., objective assemblies 39. The number of profile imaging channels multiplied by the separation angle between the profile imaging channels may be limited to a maximum of 360 degrees. The measurement system 34 may use a single profile imaging channel (i.e., profile light source 34/profile imaging module 35 pair) to collect multiple views (e.g., two views) of the ferrule. This may enable a multiple number of (e.g. twice as many) views as compared to having a single view per channel.

Each profile light source 36 may provide light 50 having a cross-section larger than the ferrule 14, thereby backlighting both apexes and end-face of the ferrule 14. Each profile imaging objective 41 may generate an image of the visible ferrule profile. However, only the areas of the ferrule profile containing position information may be recorded by the apex imagers 54, 56. One apex imager 54, 56 may capture one apex while the other apex imager 54, 56 captures the opposing apex. In this way, the imaging system may capture two full-resolution images of the ferrule profile using a single profile imaging objective 41.

Each of the core imager 37 and apex imagers 54, 56 may include an image sensor (e.g., a charge-coupled device or active-pixel sensor comprising a two-dimensional array of sensor elements), and one or more optical elements (e.g. lenses) configured to focus an image of a portion of the ferrule 14 on the image sensor. The core imager 37 may be configured so a portion of the end-face 18 (FIG. 1) of ferrule 14 proximate the micro-bore 16 can be focused as an image on its image sensor. The apex imagers 54, 56 of each profile imaging module 35 may be configured so that portions of the ferrule silhouette corresponding to opposing apexes of the outer surface 20 of ferrule 14 and portions of the end-face 18 are focused as images on their respective image sensors.

Each apex imager 54, 56 may be configured to capture an image centered on a different portion of the ferrule 14. Each profile light source 36 may backlight the ferrule 14 with respect to its respective profile imaging module 35. This backlighting may cause the profile imaging module 35 to produce images of the ferrule 14 having characteristics similar to that of a silhouette. The optical components of the profile light sources 36 and apex imagers 54, 56 may be configured to provide numerical apertures such that the resolving power of the optics is less than that of the image sensors. That is, the optical components may be configured to have a minimum resolvable dimension d (e.g., a diffraction limited resolution) that is larger than the dimensions of a single pixel of the imaging sensor. By way of example, the diffraction limited minimum resolvable dimension $d_0$ may be provided by:

$$d_0 = \frac{1.22\lambda}{NA_{obj} + NA_{con}} \quad \text{Eqn. 1}$$

where $\lambda$ is the wavelength of light being imaged, $NA_{obj}$ is the numerical aperture of an objective lens of the apex imager 54, 56 (e.g., the profile imaging objective 41), and $NA_{con}$ is the numerical aperture of a condenser lens in the optical path 48 between the light source 36 and ferrule 14. In cases where a condenser lens is not used, the value of $NA_{con}$ may be zero. In this case, the working numerical aperture NA may be equal to $NA_{obj}$. The working numerical aperture NA may also be adjusted by the aperture stop 45.

Advantageously, and as described in additional detail below, a working numerical aperture NA which distributes edge transitions across a plurality of pixels may facilitate aligning ferrules with sub-pixel precision. By way of example, the optical components may be configured to provide a resolving power $d_0$ of between 2 and 20 pixels. Thus, for an image sensor having 2×2 μm pixels, the numerical aperture NA may be configured to provide an optical resolution do of between 4 and 40 μm, (e.g., a working aperture NA of between 0.17 and 0.017 at λ=550 nm), with an optical resolution $d_0$=20 μm (e.g., NA=0.034) being typical.

Replicating the optical paths 48 multiple times around the center axis 22 of ferrule 14 may provide multiple profile images from which to extract the position of the ferrule 14. Backlighting the ferrule 14 may result in high contrast between areas of the image occupied by the ferrule 14, and areas of the image not occupied by the ferrule 14. Advantageously, high contrast images may allow for short exposure times, lower image noise, and facilitate determining the location of edges in the image associated with the end-face 18 or an apex of the outer surface 20 of ferrule 14. However, it should be understood that in alternative embodiments, other forms of lighting, such as side lighting or front lighting (e.g., from a profile light source 36 associated with another profile imaging module 35) could be used to illuminate the ferrule 14.

Figure 2:
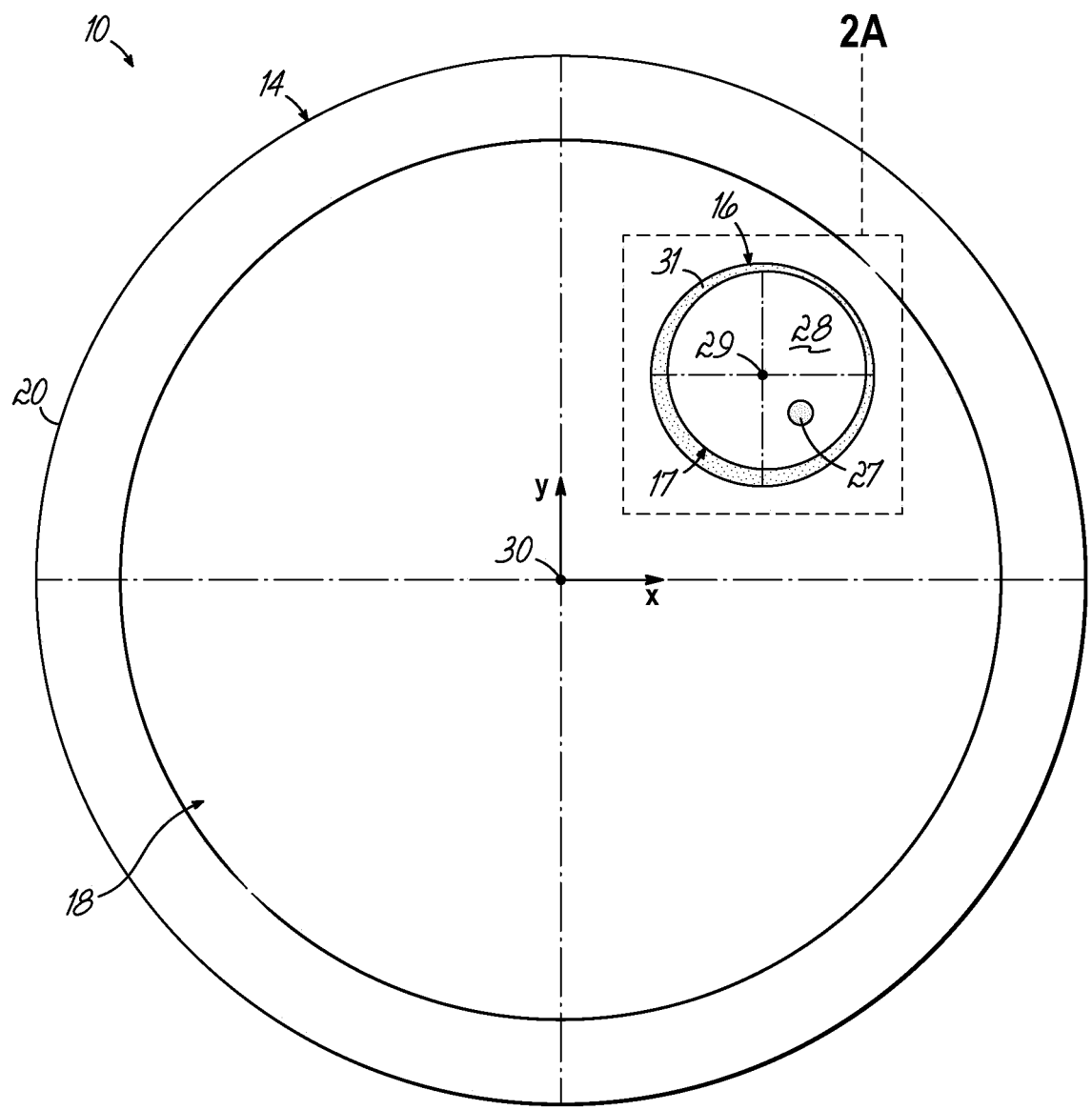
FIG. 2 is a schematic illustration of a typical end face of a ferrule of the fiber optic connector of FIG. 1 having an optical fiber positioned in a micro-bore of the ferrule.
Figure 2A:
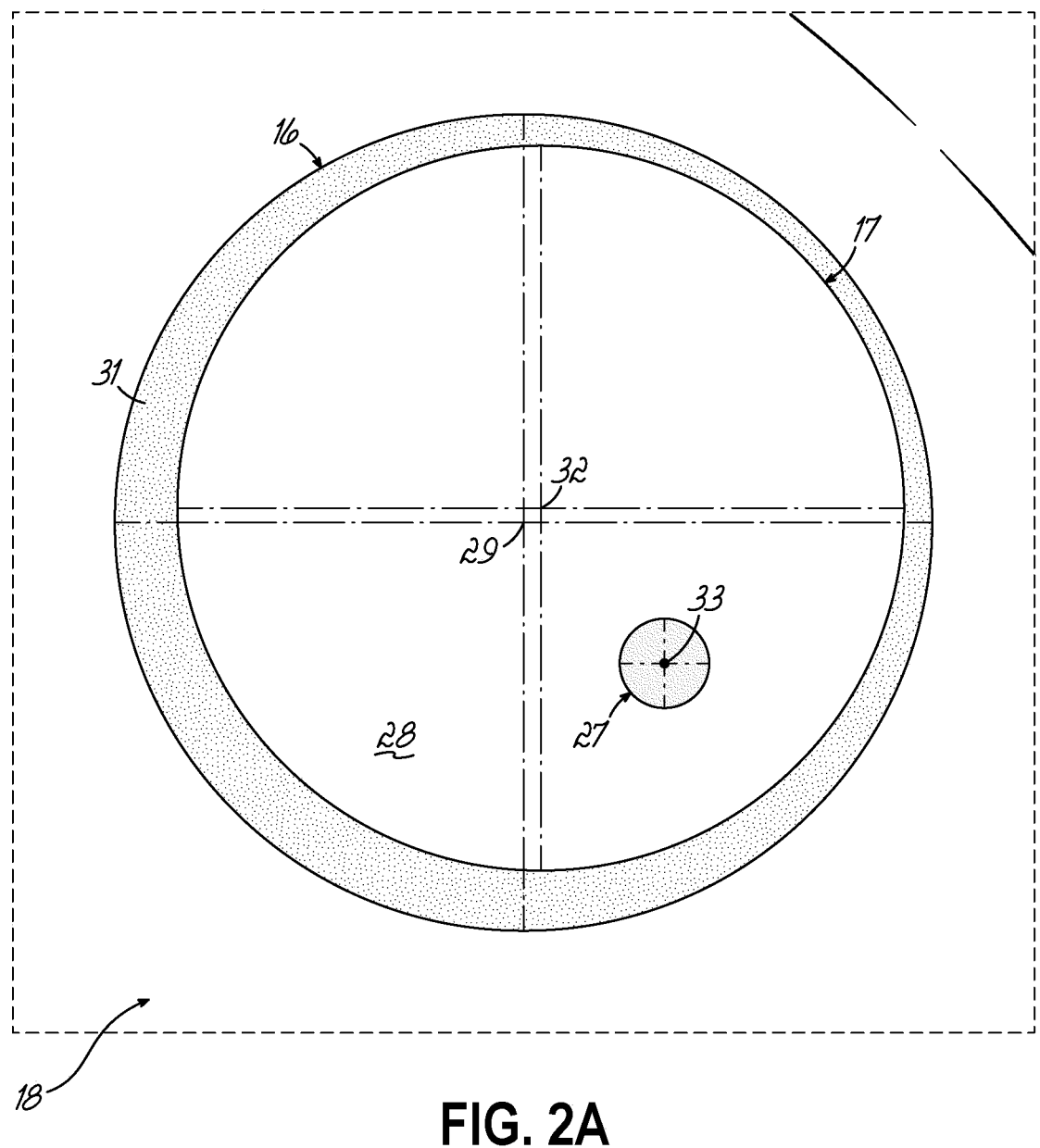
FIG. 2A is an enlarged schematic illustration of the area 2A shown in FIG. 2.

The positioner 40 may include one or more actuators (e.g., piezoelectric elements, precision screw drives, or the like) configured to provide a six-degree of freedom movement to the measurement port 38. By way of example, the positioner 40 may include a hexapod (sometimes referred to as a Stewart platform) having a 6-axis (x, y, z, α, β, γ) actuator system. Although the orientation and position of each of these axes may be arbitrarily assigned, to provide a common frame of reference, the z-axis may be considered as being aligned with a vector 60 pointing from the end-face 18 of ferrule 14 toward the core imager 37. Thus, the position and orientation of the z-axis may be coextensive with the longitudinal center axis 22 (FIG. 1) of ferrule 14 when the ferrule 14 is aligned with the measurement system 34. Following the right-hand rule, the x-axis may be considered as being aligned with a horizontal vector 61 orthogonal to the z-axis (i.e., pointing outward from FIG. 2), and the y-axis may be considered as being aligned with a vertical vector 62 orthogonal to (e.g., pointing upward from) both the x and z-axes 60, 61. As described herein, tip ($\alpha$), tilt ($\beta$), and rotation ($\lambda$) may correspond to rotation about each of the respective x, y, and z-axes. By moving the ferrule 14 in each of these six axes (x, y, z, $\alpha$, $\beta$, $\gamma$), the positioner 40 may enable the system controller 44 to position the ferrule 14 precisely relative to the components mounted to the support assembly 46, e.g., the profile imaging modules 35, the profile light sources 36, and the core imager 37.

The core light source 42 may be configured to provide light to an optical fiber coupled to the connector 10, and may include an illuminant (e.g., a 1620 nm laser, light emitting diode (LED), or the like), and one or more components that operatively couple the illuminant to the optical fiber (e.g., an integrating sphere). Injecting light into the proximal end of fiber optic cable 12 may improve the ability of core imager 37 to capture a high-contrast image of the portion of the end-face 18 including the core 27 of optical fiber 17. The use of an integrating sphere to couple the illuminant to the optical fiber may enable a pseudo-etendue measurement by providing the same light grasp to lower mode field diameter/higher numerical aperture and higher mode field diameter/lower numerical aperture optical fibers.

Figure 5:
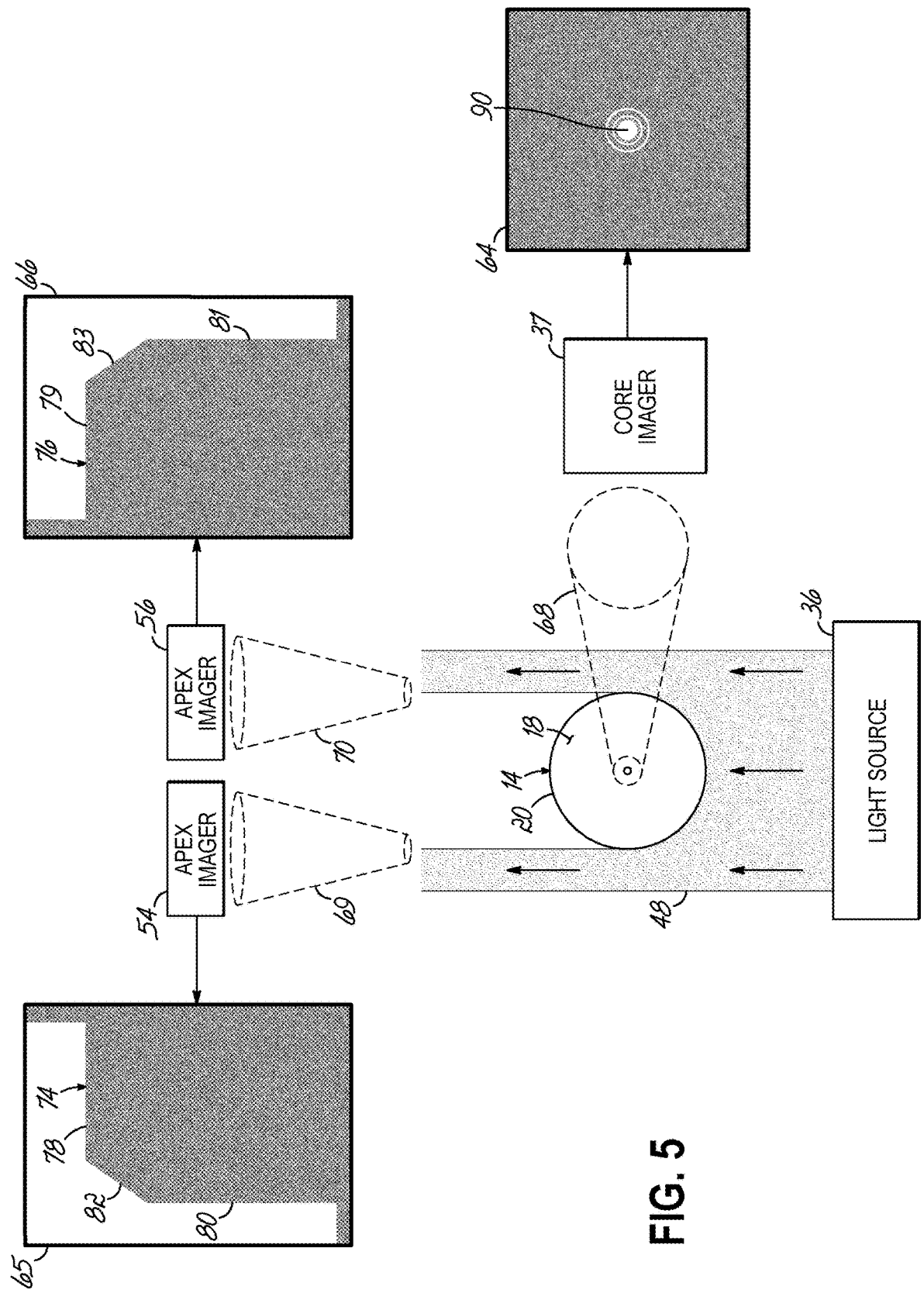
FIG. 5 is a diagrammatic view of exemplary images that may be captured by the measurement system of FIG. 1.

FIG. 5 depicts exemplary images 64-66 that may be captured by the core imager 37 and apex imagers 54, 56 during operation of the measurement system 34. The core imager 37 and apex imagers 54, 56 may have a respective magnification or "gain" 68-70 that provides an optimum image scale for determining ferrule position based on the location of image elements in the images 64-66. For example, the gain 68 of core imager 37 may be set so that the width of each pixel in the core image 64 corresponds to a distance of 0.1 to 1.6 μm at the end-face 18 of ferrule 14, with a typical gain being g=0.4 μm/pixel. As another example, the gain 69, 70 of each apex imager 54, 56 may be set so that the width of each pixel in the profile images 65, 66 corresponds to a distance of 0.3 to 4.8 μm at the apexes of ferrule 14, with a typical gain being g=1.2 μm/pixel. Having a known image gain for each image 64-66 may enable the position and orientation of the ferrule 14 to be determined based on the size and location of image elements in units of pixels.

The profile images 65, 66 captured by the apex imagers 54, 56 may include a portion 74, 76 of the silhouetted profile of the ferrule 14. Each profile image module 35 may be configured so that its portion 74, 76 of the silhouetted profile corresponds to a respective portion of ferrule 14 where the end-face 18 meets the outer surface 20. As a result, each profile image 65, 66 may include a plurality of image elements in the form of edges 78-83. In the exemplary profile images 65, 66, edges 78, 79 may correspond to the end-face 18, and edges 80, 81 may correspond to apexes of the outer surface 20 on opposite sides of the ferrule 14. In cases where the ferrule 14 includes a chamfer connecting the end-face 18 to the outer surface 20 (such as depicted in FIG. 4), the profile images 65, 66 may include additional edges 82, 83 associated with the chamfer.

Because the profile edges 78-83 define outer boundaries of the ferrule 14, their location in the profile images 65, 66 may be used to align the ferrule 14 with and along the z-axis. This physical alignment may position the ferrule 14 so that its center axis 22 is orthogonal to and generally centered in each optical path 48. Thus, each apex edge 80, 81 of a profile image 65, 66 may be analogous to one jaw of an optical collet that centers the ferrule 14 along the z-axis of the measurement system 34. Alignment along the z-axis may be obtained using the edges 78, 79 generated by the end-face 18. The location of the edges 78-83 may be recorded using pixel coordinates of each pixel that is considered as part of the edge, and used as a reference (e.g., a fiducial marker) for later measurements, such as comparisons with another ferrule.

The image 64 captured by the core imager 37 may include (e.g., be generally centered on) the core 27 of optical fiber 17 as seen from the end-face 18 of the ferrule 14. Because light is fed into the optical fiber 17 while images are captured by the core imager 37, the core 27 may appear as an image element in the form of a circular disk 90 (e.g., a Gaussian disk) against a dark background in the core image 64. The location and size of the core 27 may also be recorded using pixel coordinates of the image sensor, and used as a reference for later measurements, e.g., for comparisons with another ferrule.

As described in detail below, the location of the center axis 22 of a ferrule 14 in the reference core image may be determined by superimposing the ferrule 14 into the same three-dimensional space with a specific amount of rotation about the z-axis between each image. Superimposing the same connector on itself where each superposition is at a different "clocking angle" $\gamma_{clk}$ about the z-axis may be referred to as "self-superposition". Self-superposition may enable a pseudo-rotation mode where a connector is "clocked" to an angular position and remeasured. By repeating these measurements for n clocking intervals, a rotational orbit of the core disk around the longitudinal center axis 22 can be identified. This orbit may be used to determine the core-to-ferrule eccentricity (core position relative to the center axis 22 of the ferrule 14).

The ferrule position measurement requirements may be different across the ferrule 14 as compared to along the ferrule 14. The lateral position measurement may be used to determine both core-to-ferrule and ferrule angle, and the measurement along the ferrule 14 may provide focus information. Typically, the measurement along the ferrule 14 may not need to be as precise as the lateral position measurements. There may also be an asymmetry in space constraints between the lateral (x- and y-axes) and longitudinal (z-axis) directions. For example, the connector inner housing may intrude along the ferrule 14 such that a wide illumination cone could reduce the length of the ferrule 14 available for measurement.

The above design drivers may be addressed simultaneously using asymmetric aperture stops. For example, the aperture stop for each light source 36 (not shown) may be elliptical and have a minor axis aligned with the z-axis. This asymmetry may provide a smaller numerical aperture and a narrower cone of rays along the ferrule 14, while also providing a desired numerical aperture across the ferrule 14. In contrast, the aperture stops 45 in the apex imagers 54, 56 may be circular with a diameter greater than the minor axis of the light source aperture stop and smaller than the major axis of the light source aperture stop.

Figure 6:
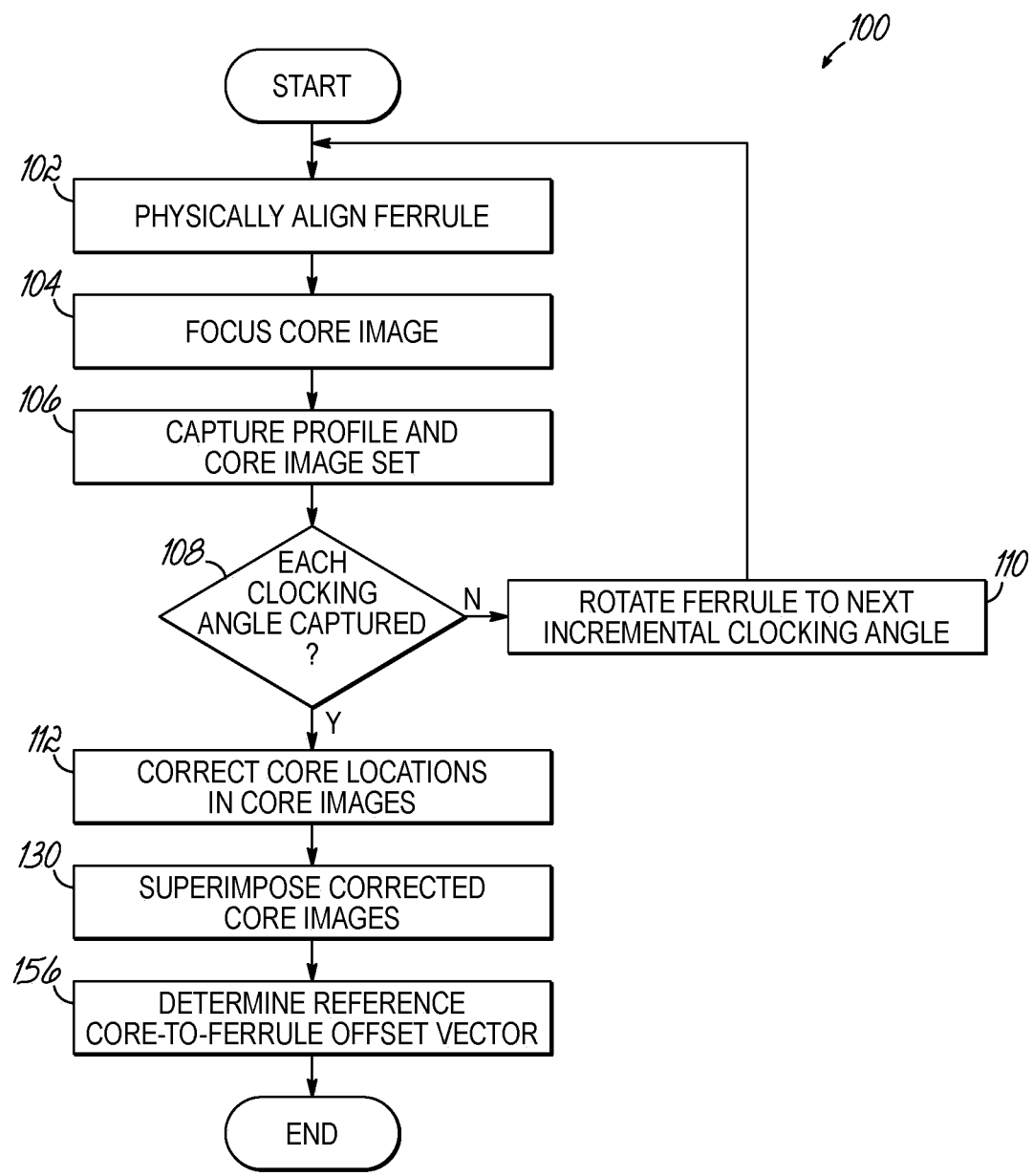
FIG. 6 is a flowchart of a process that may be used to determine a core-to-ferrule offset of a reference ferrule with the measurement system of FIG. 1.

FIG. 6 depicts a flowchart illustrating a process 100 for characterizing a ferrule that may serve as a reference ferrule. The process 100 involves capturing a set of images of the ferrule at each of a plurality of rotation angles $\gamma$ about the z-axis of the measurement system reference frame. In block 102, the reference characterization process 100 may physically align the ferrule in the measurement system 34. To this end, the process 100 may receive profile and core images of the ferrule and identify image elements therein. The reference characterization process 100 may then compare characteristics of the image elements (e.g., their locations) to a reference set of image elements, as described in more detail below. Based on these comparisons, the reference characterization process 100 may determine how to reposition the ferrule. Physical alignment may be iterative, with new images being captured after each re-positioning of the ferrule.

By way of example, the locations of the profile edges may be compared to a set of fiducial markers. Each fiducial marker may be defined by a predetermined set of pixel coordinates (e.g., for an initial alignment with the measurement system 34), or by pixel coordinates associated with previously identified profile edges (e.g., for comparisons between multiple sets of images of the ferrule). Analysis of the core images may include a number of fit parameters, such as core-to-ferrule offset, core light intensity amplitude, the position of the core in the core image (in x-y pixel coordinates), width of the core (e.g., measured along x and y-axes), and ferrule rotation angle γ about the z-axis, i.e., in the x-y plane.

Edge detection may include convolution of the image with a derivative of a Gaussian function to provide a smooth derivative of the image. The smoothness of the image may also be provided, at least in part, by adjusting the numerical aperture NA of the imaging system in question. In any case, the resulting distribution of edge illuminance across the derivative of the image may enable the location of the edge to be determined to sub-pixel resolution. For example, the edge location may be indicated by a point on the derivative of the image having a maximum value. The location of this peak value may indicate where the image intensity gradient is at a local maximum. By defining the point of transition from bright to dark pixels, the peak value of the derivative of the image may provide the precise location of the edge in the image.

In response to identifying a misalignment between the profile edges and the fiducial markers, the process 100 may cause the positioner 40 to move the ferrule in a manner that reduces the misalignment. As part of the physical alignment in block 102, the reference characterization process 100 may adjust the position of the ferrule along the z-axis to align profile edges associated with the end-face with fiducial markers, as well as to obtain a rough focus of the core disk in the core image.

In response to determining that the ferrule has been sufficiently aligned with the measurement system 34 (e.g., within 500 nm in each linear dimension (x, y, z), and within 20 μrad angular alignment in each angular dimension (α, β, γ)), the process 100 may proceed to block 104 and obtain a final focus of the core image. Final focusing of the core image may include adjusting a lens in the core imager 37 to achieve a best-focus of the core disk in the core image. Best-focus may be achieved, for example, when the diameter of the core disk is at a minimum. An exemplary process for achieving best focus is described below with respect to FIGS. 13 and 14.

Once the core image is focused, the reference characterization process 100 may proceed to block 106 and capture one or more sets of images including a core image and a plurality of profile images. Each set of images may be captured simultaneously, or nearly simultaneously (e.g., within 0.001 second of each other), so that the locations of features in each of the images corresponds to the position of the ferrule at the same point in time. Advantageously, simultaneous capture of all the images in the set of images may allow common mode errors (e.g., errors due to noise and vibration) to be accounted for. Multiple images may also be captured (e.g., 32 images per channel) and averaged to improve accuracy and insure repeatability.

In block 108, the reference characterization process 100 may determine if a set of images has been captured for each of a plurality of rotational angles, e.g., clocking angles $\gamma_{clk}$, about the z-axis. The clocking angles $\gamma_{clk}$ may be spaced at an integral fraction of a full rotation, e.g.

$$\gamma_{clk\_i} = \frac{2\pi \times i}{n} \qquad \text{Eqn. 2}$$

where n is the number of clocking angles $\gamma_{clk}$ in a full rotation.

If a set of images has not been captured at each clocking angle $\gamma_i$ (i.e., "NO" branch of decision block 108), the reference characterization process 100 may proceed to block 110, incrementally rotate the ferrule to the next clocking angle $\gamma_{clk}$, and return to block 102 to physically align the ferrule based on a previously captured set of images. To facilitate clocking of the ferrule, the positioner 40 may include a ring of kinematic v-block features around its periphery. These features may enable the measurement port 38 to be rotated to a plurality of discrete clocking angles. The fiber optic connector 10 may be removed before and replaced after each clocking operation, or left in the measurement port 38 during the clocking operations. If a set of images has been captured at each clocking angle $\gamma_{clk}$ (i.e., "YES" branch of decision block 108), the reference characterization process 100 may proceed to block 112.

In block 112, the reference characterization process 100 may correct the core location in one or more of the captured core images. As described in more detail below, correcting the core positions may include selecting one set of images as a reference set, and comparing the profile edges in each of the other sets of images to the profile edges in the reference set of images. The location of the core disk in the other core images may then be adjusted based on the profile image comparisons.

To determine the location of the center of the core disk, the intensity of the core disk verses location in the image plane may be modeled using a two-dimensional Gaussian function F(x,y):

$$F(x, y) = I_0 + A \times e^{-\frac{1}{2}\left(\frac{x-x_0}{\sigma_x}\right)^2} \times e^{-\frac{1}{2}\left(\frac{y-y_0}{\sigma_y}\right)^2} \qquad \text{Eqn. 3}$$

where $I_0$ is a background or base intensity level, A is an amplitude scaling factor that accounts for the amount of light fed into the optical fiber, $x_0$ and $y_0$ are the coordinates of the core center, and $\sigma_x$ and $\sigma_y$ are the standard deviations for the intensity in the x and y-axes. The dimensions of the core disk size and position may be in pixels. The diameter or width w of the core disk may be determined based on the standard deviation of the intensity function, e.g., as equal two standard deviations, or $w = 2 \times \sigma$.

Rotation of the ferrule from one angle $\gamma_1$ to another $\gamma_2$ may cause the position of the core to shift, and can be accounted for by using the rotation matrix to modify the intensity function F(x,y) as follows:

$$F(x, y)_{\gamma_2} = F(x, y)_{\gamma_1} \times \begin{bmatrix} \cos(\gamma_2 - \gamma_1) & -\sin(\gamma_2 - \gamma_1) \\ \sin(\gamma_2 - \gamma_1) & \cos(\gamma_2 - \gamma_1) \end{bmatrix} \quad \text{Eqn. 4}$$

The value of one or more parameters in Equation 3 may be determined by adjusting their values to minimize a residual between the image intensity provided by the intensity function F(x,y) and the actual intensity I(x,y) of one or more core images received from the core imager 37. For example, the core position and standard deviation may be determined as having values that minimize the following least squares error function:

$$LSE = \sum_{x=x_{min}}^{x_{max}} \sum_{y=y_{min}}^{y_{max}} (I(x, y) - F(x, y))^2 \quad \text{Eqn. 5}$$

Using the Gaussian function F(x,y) to identify the center of the core disk may allow the location of the core to be precisely determined within the core image to sub-pixel resolution.

Figure 7:
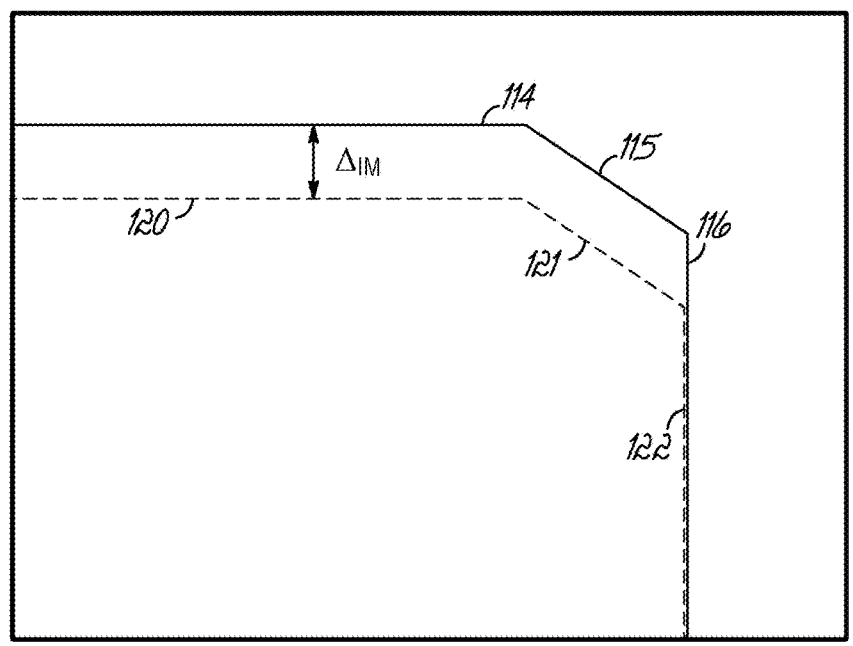
FIG. 7 is a diagrammatic view of an exemplary profile image captured by the measurement system of FIG. 1 showing an image displacement between a profile edge and a fiducial marker.
Figure 8:
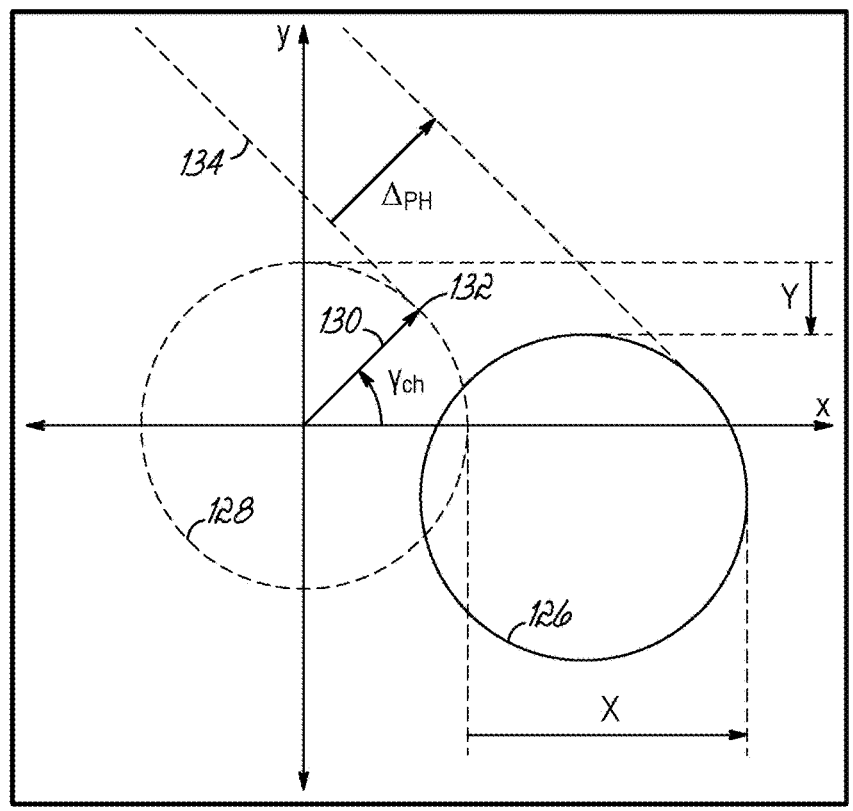
FIG. 8 is a diagrammatic view of exemplary relative positions of a reference ferrule and a test ferrule associated with the image displacement depicted by FIG. 7.

FIG. 7 depicts an exemplary set of profile edges 114-116 superimposed with an exemplary set of fiducial markers 120-122. The fiducial markers 120-122 may be associated with profile edges from a reference profile image, a previously captured profile image of the current ferrule, or in the case of an initial physical alignment, may be a predetermined set of markers configured to initially position the ferrule within the measurement system 34. FIG. 8 depicts a physical position 126 of the ferrule associated with the set of profile edges 114-116, and a physical position 128 associated with the fiducial markers 120-122, each plotted in the x-y plane. It should be understood that for purposes of clarity, the amount of mis-alignment depicted between the profile edges 114-116, fiducial markers 120-122, and physical positions 126, 128 of FIGS. 7 and 8 may be both exaggerated and not to scale.

As can be seen in FIG. 7, the apex edge 114 has a positive image displacement $\Delta_{IM}$ from the apex fiducial marker 120 as measured in the image plane. Image displacement $\Delta_{IM}$ may be a result of the physical displacement $\Delta_{PH}$ of the apex of the ferrule from position 128 to position 126 depicted in FIG. 8. This physical displacement $\Delta_{PH}$ may be due, for example, due to an inability of the positioner 40 to position the ferrule any more precisely. That is, the physical displacement $\Delta_{PH}$ may be less than the spatial resolution of the positioner 40.

The following equations may define a mathematical relationship between the physical displacement of the ferrule $\Delta_{PH}$ (e.g., in microns) and the image displacement $\Delta_{IM}$ measured in pixels:

$$\Delta_{IM} = g \times (X \times \cos(\gamma_{ch}) + Y \times \sin(\gamma_{ch})) \quad \text{Eqn. 6}$$

where g=the gain of the apex imager, X is the physical displacement of the ferrule along the x-axis, Y is the physical displacement of the ferrule along the y-axis, and $\gamma_{ch}$ is the channel angle of the profile image. As described in more detail below, the relationship defined by Equation 6 may enable image displacements $\Delta_{IM\_P}$ in the profile images to be mapped to image displacements $\Delta_{IM\_C}$ in the core image. The resulting core image displacement $\Delta_{IM\_C}$ may then be used to correct the location of the core disk in the core image. For example, by subtracting the core image displacement $\Delta_{IM\_C}$ from the pixel coordinates of the core disk in the core image to determine a corrected location, and moving the core disk to the corrected location.

For a coordinate system in which the x-axis represents an angle of rotation $\gamma$=0 radians in the x-y plane, the channel angle $\gamma_{ch}$ may be the angle between the x-axis and a ray 130 connecting the origin to a point 132 on the cylindrically shaped outer surface of the ferrule. The point 132 may be a point on the outer surface of the ferrule tangent to a line of sight 134 from the apex imager capturing the profile image. Thus, the apex of the ferrule imaged by a particular apex imager may comprise a line on the cylindrically shaped outer surface each point of which is tangent to the line of sight of the imager.

The gain g and channel angle $\gamma_{ch}$ of the apex imagers may have values that were previously determined, e.g., using a calibration procedure. An exemplary calibration procedure may determine the gain g of each imager by moving the ferrule a known amount with the positioner 40 to provide known physical displacement values X and Y. Two or more independent measurements of $\Delta_{IM}$ may then be used to solve for the channel angle $\gamma_{ch}$ and the gain g in Equation 6, thereby providing the gain of the apex imagers 54. Determining the gain g of the core imager 37 may involve a similar process in which the rotation matrix R and a translation matrix Tare is used to transform image coordinates (pixels) to positioner coordinates as shown:

$$\begin{bmatrix} X_{pxl} \\ Y_{pxl} \end{bmatrix} = R \begin{bmatrix} X_{\mu m} \\ Y_{\mu m} \end{bmatrix} + T \quad \text{Eqn. 7}$$

To solve Equation 6 having two unknowns X and Y, at least one other independent measurement may be needed to determine the physical offsets X and Y. This independent measurement may be provided by profile images from another channel angle $\gamma_{ch}$. For cases where there are n>2 channel angles, physical offsets X and Y can be determined using a least squares method. By way of example:

for i=0 to (n−1), define the following matrices:

$$A = [g_i \times \cos(\gamma_{ch\_i}), g_i \times \sin(\gamma_{ch\_i})]$$

$$B = [\Delta_{IM\_i}]$$

and $$C = \begin{bmatrix} X \\ Y \end{bmatrix}$$

The physical offset of the ferrule may then be provided by:

$$C = A^{-1}B \quad \text{Eqn. 8}$$

Correction of the core disk location in the core image may then be made by converting the physical displacement C into a core image displacement $\Delta_{IM\_C}$ using the gain of the core imager:

$$\Delta_{IM\_C} \times \frac{C}{g_{core}} \quad \text{Eqn. 9}$$

Figure 9:
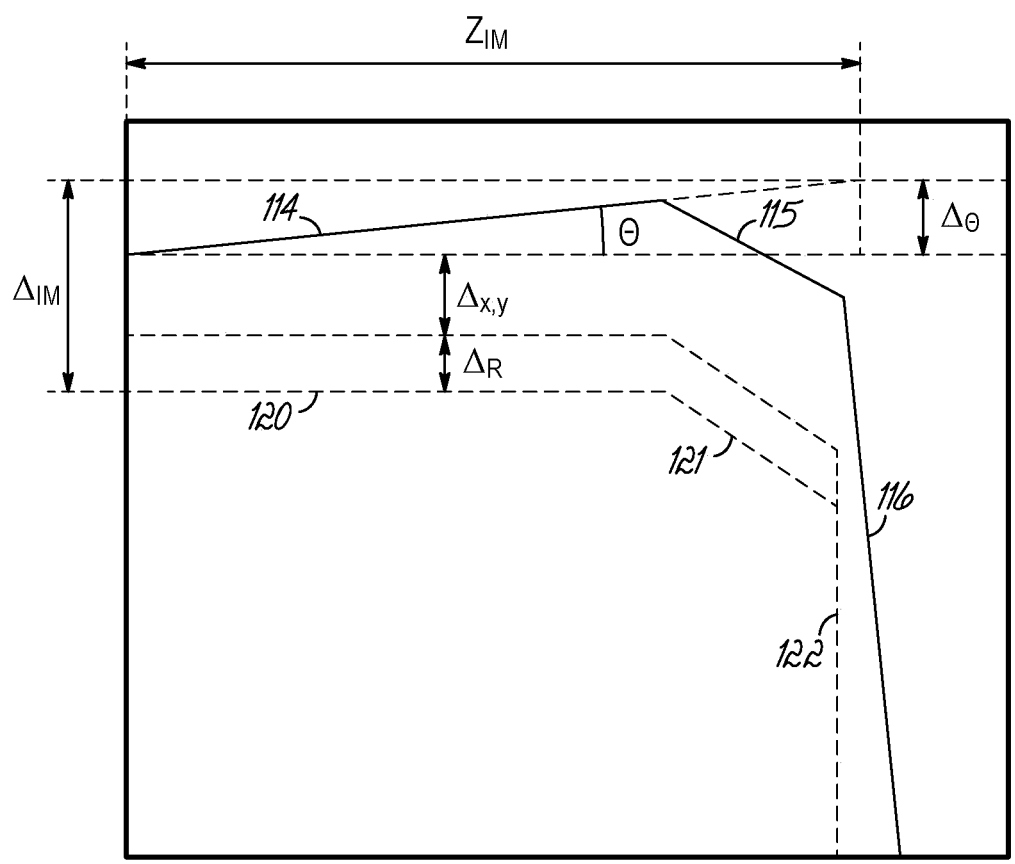
FIG. 9 is a diagrammatic view of an exemplary profile image that may be captured by the measurement system of FIG. 1 showing an image displacement between a profile edge and a fiducial marker due to a linear displacement, an angular displacement, and an increased radius of the test ferrule.

Referring to FIG. 9, the mathematical correction of the core disk location in the core image may be expanded to account for differences in ferrule radius and angular position errors. Changes in ferrule radius may be caused by an eccentricity of the cylindrical shaped outer surface in the case of comparisons of profile images of the same ferrule, or due to manufacturing tolerances for comparisons between different ferrules. Misalignments with the z-axis may be due to limits on the ability of the positioner 40 to precisely position the ferrule. For example, in a 1 mm ferrule, a tilt of only 10 μrad would cause 10 nm shift of the core position, which is about the same distance as the repeatability of measurements for the measurement system 34.

The image displacement $\Delta_{IM}$ depicted in FIG. 9 includes a component $\Delta_R$ due to a difference in radius (e.g., a larger radius) of the ferrule as compared to a previous profile image, a component $\Delta_{X,Y}$ due to a physical displacement of the ferrule as described above with respect to FIGS. 7 and 8, and a component $\Delta_\theta$ due to a slope θ in the profile edge 114 as compared to the apex fiducial marker 120. The value of component $\Delta_\theta$ may depend in part on a distance $Z_{IM}$ between the vertex from which the slope θ is measured and the end-face edge 116. The following equation defines a mathematical relationship between the physical displacement of the ferrule and the displacement $\Delta_{IM}$ measured in pixels in the image plane that may be used to correct the location of the core disk in the core image:

$$\Delta_{IM} = g \times (X \times \cos(\gamma_{ch}) + Y \times \sin(\gamma_{ch}) + R_R + Z_{IM} \times \cos(\gamma_{ch}) \times \tan(V) + Z_{IM} \times \sin(\gamma_{ch}) \times \tan(U))$$  Eqn. 10 where U and V represent the orientation of the ferrule in the x and y-axes.

Figure 10:
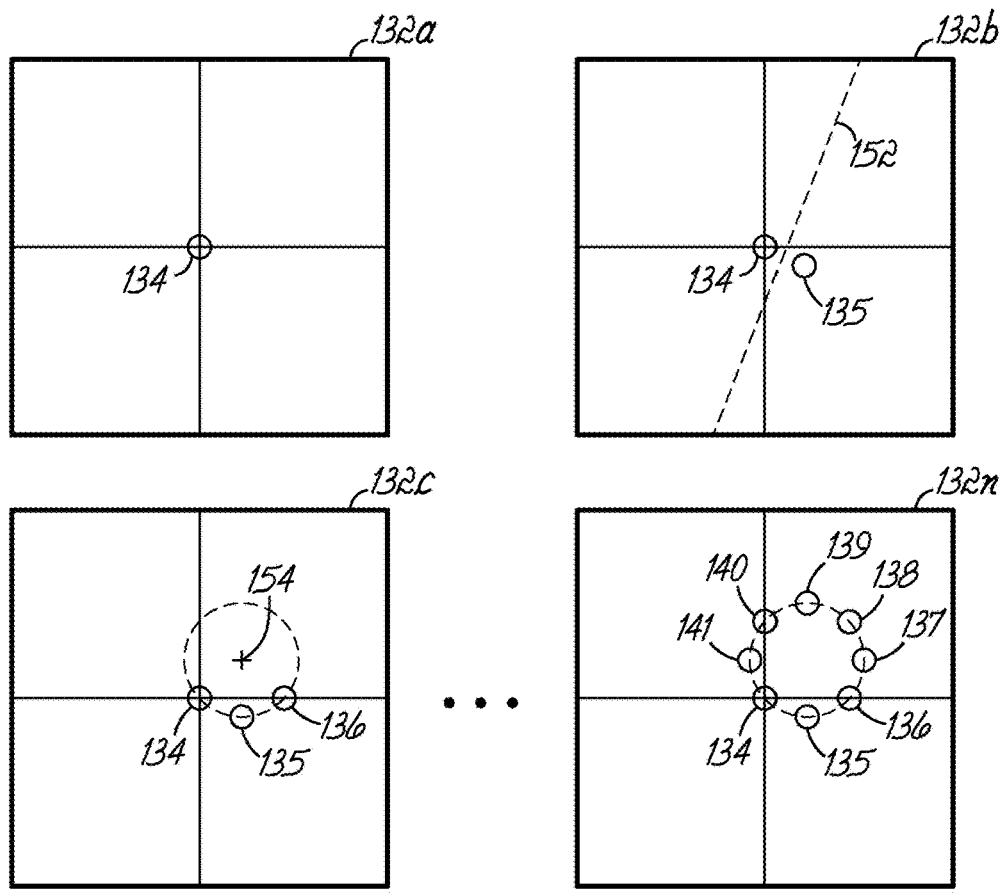
FIG. 10 is a diagrammatic view of image frames depicting core disks superimposed onto a composite core image of a reference ferrule at different rotational angles.

Referring again to FIG. 6, in block 130, the reference characterization process 100 may superimpose the corrected core images into a single core image. FIG. 10 depicts a series of frames 132a-132n illustrating a sequential superposition of core images captured at different clocking angles $\gamma_{clk}$ of the ferrule. Frame 132a depicts an image frame in which a core disk 134 is centered at the origin of a pixel coordinate system having an x-axis and a y-axis. The core disk 134 in the image frames 132a-132n may be from any one of the core images captured by reference characterization process 100, such as the core image from the initial set of images, which may be assigned a clocking angle $\gamma_{clk}=0$.

Frame 132b depicts the image frame after the superposition of a core disk 135 from the core image of a set of images taken at a subsequent clocking angle, e.g., $\gamma_{clk}=2\pi/n$. Presuming the core rotates about the center axis of the ferrule as the ferrule is clocked, the two core disks 134, 135 may define a line 152 in the image frame 132b. Each point on the line 152 may be an equal distance from each core disk 134, 135. Thus, the yet undetermined location of the pixels corresponding to the center axis of the ferrule may lie somewhere on the line 152.

Frame 132c depicts the image frame after the superposition of a third core disk 136 from the core image of another set of images taken at a subsequent clocking angle, e.g., $\gamma_{clk}=4\pi/n$. Three core disks 134-136 may define a point 154 in the image frame 132c that is equidistant from each core disk 134-136. Thus, the point 154 may indicate the location at or proximate to the longitudinal center axis of the ferrule. Frame 132n depicts the image frame after the superposition of all n (e.g., n=eight) core disks 134-141 from the core images of each set of images taken at each clocking angle $\gamma_{clk}$.

Figure 11:
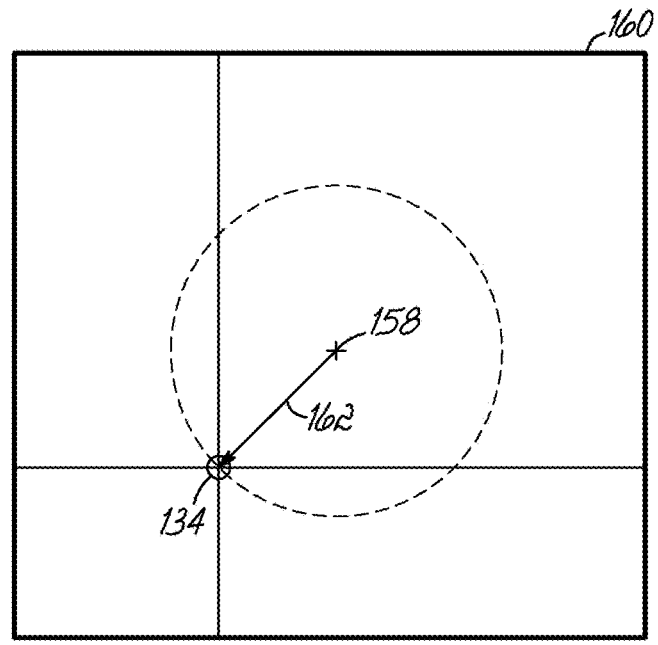
FIG. 11 is a diagrammatic view of an image frame showing a core-to-ferrule offset vector determined for the reference ferrule of FIG. 10 based on the composite core image.

In response to the corrected core images being superimposed onto a composite core image, the reference characterization process 100 may proceed to block 156. In block 156, the reference characterization process 100 may determine a reference core-to-ferrule offset vector. Due to errors in measurement, each core disk 134-141 may not be exactly equidistant from any point in the composite core image. To determine the location of the center axis of the ferrule, the reference characterization process 100 may determine the geometric center of the core disks 134-141. The reference characterization process 100 may then determine the core-to-ferrule offset vector $\overrightarrow{CTF}$ as the vector connecting the geometric center 158 of the core disks 134-141 to the center of the core disk 134-141 corresponding to the clocking angle $\gamma_{clk}$ at which the ferrule will be used. FIG. 11 depicts an image frame 160 including an exemplary reference core-to-ferrule offset vector $\overrightarrow{CTF_{REF}}$ 162 for clocking angle $\gamma_{clk}=0$.

As described below, this known offset vector $\overrightarrow{CTF_{REF}}$ 162 (or an offset vector for any other clocking angle $\gamma_{clk}$) may be used as a reference vector to determine offset vectors for additional test ferrules. Characterization of a ferrule may only need to be performed once, such that the ferrule serves as a reference ferrule for measurements to be made on other ferrules (test ferrules).

Figure 12:
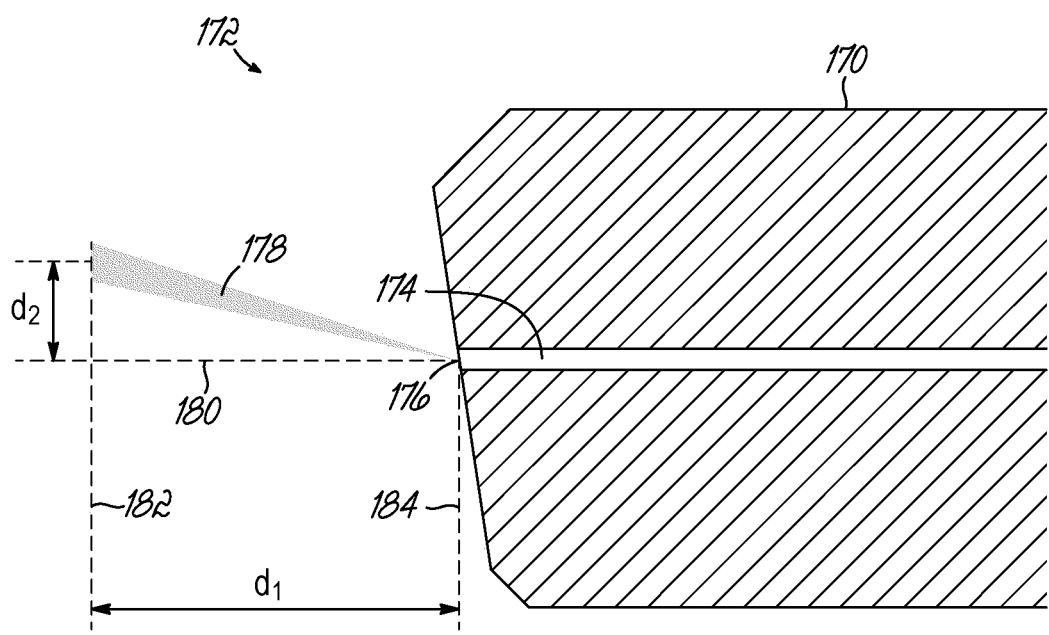
FIG. 12 is a diagrammatic view of an angled physical contact connector showing the effect of an offset in a plane of focus on determining a core-to-ferrule offset.

FIG. 12 depicts a cross-sectional view of an exemplary ferrule 170 for an angled physical contact (APC) connector 172. The APC connector 172 includes an optical fiber 174 having an end-face 176 that is polished at an angle, e.g., 8 or 9 degrees from vertical. At least a portion of an end-face of the ferrule 170 may also be polished with the optical fiber 174 such that the end-face of the ferrule 170 may also be angled. As a result of the angled end-face 176, light 178 emitted from the end-face 176 may be emitted at an angle relative to the center axis 180 of ferrule 170. As a result, the location of the core disk in the image plane may depend on how well the core imager is focused on the end-face of the ferrule 170. For example, the center of the core disk for a plane of focus 182 a distance $d_1$ from a plane of focus 184 that intersects the end-face 176 of optical fiber 174 may be shifted laterally by a distance $d_2$. Thus, a defocused core image may contribute to errors in the core-to-ferrule offset vector ultimately determined for the ferrule 170. An APC connector with a 9 degree end-face angle of the ferrule and having a core material with an index of refraction of 1.47 would have an off axis ray bundle angle of 4.28°. This angle may produce ~75 nm of core-to-ferrule measurement shift for every μm of defocus.

To achieve a final focus of the core on the image sensor of the core imager 37, after the ferrule 14 has been physically aligned using the positioner 40, a piezo stage that holds the objective lens of the core imager 37 may be actuated through a small range of steps (e.g., ~one dozen 10 μm steps), and core images captured at each step. The piezo stage may position the lens in highly repeatable positions down to a nanometer level. The positioner 40 may be stable and hold position well due to a significant amount of stiction that must be overcome in order to change its position. The stability provided by this stiction may provide certain advantages. However, this stiction may also limit the ability of the positioner 40 to position the ferrule to a resolution on the order of 1 μm. Therefore, the piezo stage may be used for analyzing the autofocus position in order to achieve a precision on the order of 10 nm.

The alignment of the piezo stage axis to the z-axis of the measurement system 34 may also affect measurement accuracy. A tilt of the piezo stage axis with respect to the z-axis may introduce a core-to-ferrule measurement error. Said another way, if one ferrule is measured at a piezo stage position of +50 um, and another ferrule is measured at a piezo stage position of −50 um, the core-to-ferrule results may be skewed if the piezo stage is not angularly aligned to the z-axis. By providing a rough focus through movement of the ferrule 170 with the positioner 40, and using the piezo stage to reach a final focus, it may be possible to avoid this sensitivity to piezo stage alignment. Thus, the positioner 40 may be used for all autofocus correction above its stiction level (e.g., about 1 micrometer), so that each ferrule is brought to within the positioner resolution of the same piezo stage focus position, e.g., within one micrometer. This two-stage focusing process may reduce any sensitivity to piezo alignment down to an indetectable level.

Under certain scenarios, a "dynamic tracking auto-focus" feature may be implemented. One problem that may occur with high volume core-to-ferrule measurements involves the use of robotic arms to handle connectors 10. Robotic arms typically have less stability than a hexapod-based positioner, and a precision on the order of 10 μm, or about one tenth as good as a hexapod-based positioner. Robotic arms also typically have more "jitter" due to the number of control loops controlling the robotic arm each having less stiffness than a high-performance positioner.

By autofocusing using the piezo stage to step the lens through discrete focus positions while simultaneously strobing the profile imaging modules 35 and core imager 37, the measurement system 34 may track relative changes in the position of the end-face 18 of ferrule 14. This process may allow microns of jitter to occur while still providing an autofocus precision on the order of 10 nm. This advantage may be due to the synchronous collection of both profile and core images creating a dynamic bandwidth effect which makes it possible to track relative motions of profile and core images to MHz speeds even through the frame rate is <100 Hz. This effect may be due to a high level of synchronization (e.g., MHz level) in the capturing of the images.

This image strobing feature may enable a high volume robotic arm to place connectors 10 into the measurement port 38 and remain in contact with the connectors 10 while core-to-ferrule measurements are made. Thus, even with dithering by the robotic arm, it may be possible to measure core-to-ferrule offset vectors with an accuracy on the order of 10 nm. By allowing the end effector of a robotic arm to retain its grip on the connector 10 while measurements are being made, the image strobing feature may eliminate the time required to release and reacquire a grip on the connector 10. Advantageously, this time savings could significantly reduce the cost of core-to-ferrule measurements in high volume manufacturing.

Figure 13:
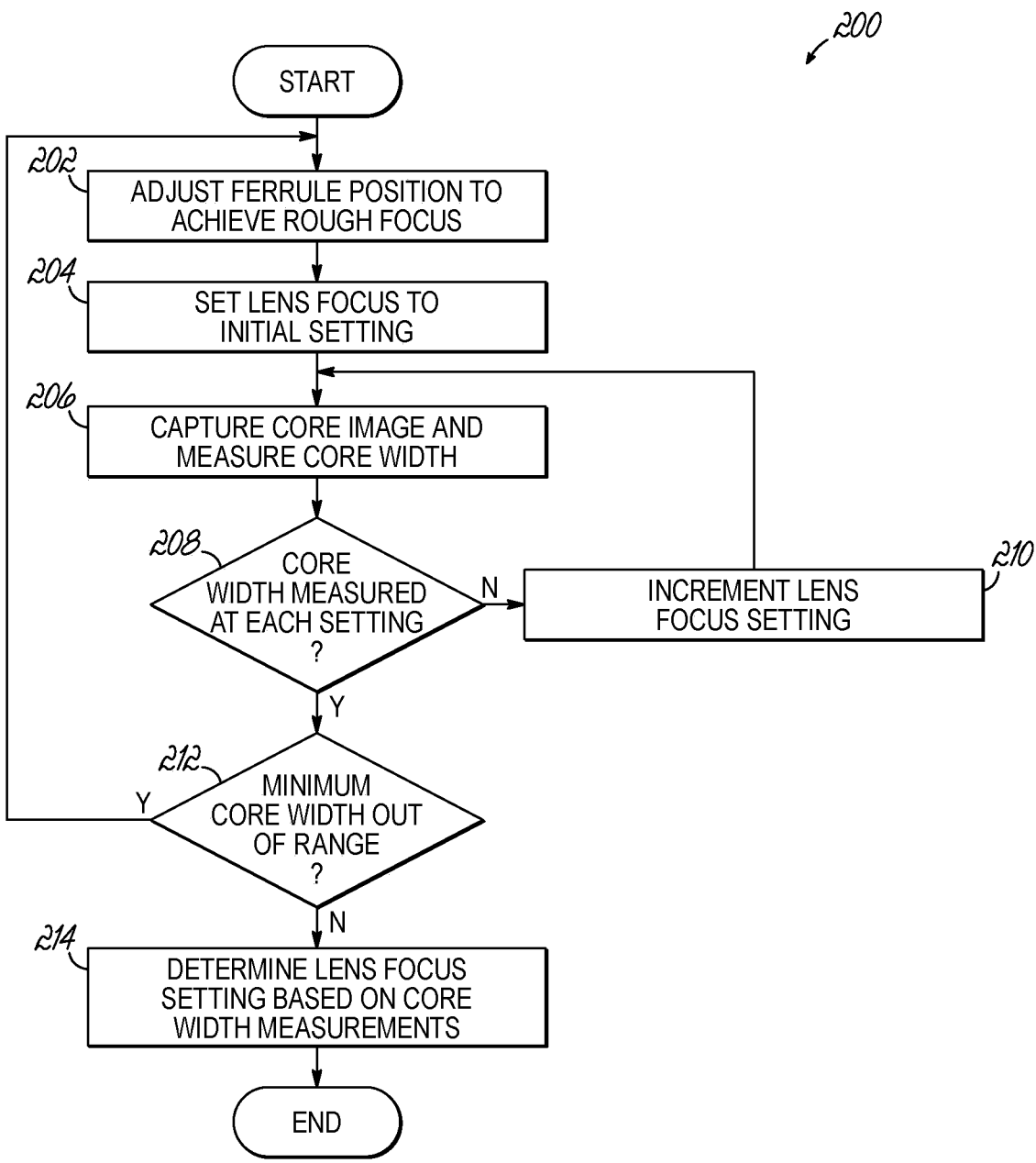
FIG. 13 is a flowchart of a process that may be used to focus a core imager on a ferrule to minimize the error depicted by FIG. 12.

FIG. 13 depicts a flowchart illustrating a process 200 for achieving a plane of focus that is aligned with the core of the optical fiber as it appears at the end-face of the ferrule being measured, e.g., at the end-face 18 of the ferrule 14 or the end-face of the ferrule 170. The focus process 200 may be executed, for example, to focus the core image in block 104 of the reference characterization process 100 depicted by FIG. 6, or any other time a process needs to focus the core imager 37. To achieve a precise focus, the focus process 200 may move a focusing lens of the core imager 37 through a sequence of steps, and determine the width of the core disk image at the image sensor of the core imager 37 at each step. The widths may then be analyzed to determine the position of the focusing lens that would provide the best focus of the core at the image sensor. This information may also be used to determine if the ferrule is in the correct final position before proceeding with core-to-ferrule measurements.

In block 202, the focus process 200 may adjust the position of the ferrule to achieve a rough focus. To this end, the focus process 200 may move the ferrule along the z-axis until the diameter of the core disk in an image captured by the core imager 37 is minimized or below a threshold size. Thus, the accuracy of the rough focus may depend on the precision of the positioner 40.

In response to determining that a rough focus has been obtained, the focus process 200 may proceed to block 204, set a position of a lens in the core imager 37 to an initial focus process setting. The initial focus process setting may be slightly inside or outside of best focus so that best focus falls within a range of sequential focus settings. By way of example, the lens may be the objective lens of the core imager 37, and may be moved using a piezo stage operatively coupled to the objective lens. Once the position of the lens is set, the focus process 200 may proceed to block 206, capture one or more core images (e.g., four images), and determine the width of the core disk in the core image(s).

In block 208, the focus process 200 may determine if the core disk width has been determined at each of a plurality of lens position settings. If the core disk width has not been measured at each lens position in the sequence of focus settings (i.e., "NO" branch of decision block 208), the focus process 200 may proceed to block 210, move the lens to the next incremental focus setting, and return to block 206. If the core disk width has been measured for each lens position setting (i.e., "YES" branch of decision block 208), the focus process 200 may proceed to block 212. The number of incremental lens position settings evaluated by the focus process 200 may vary, with a typical number being 16 lens position settings.

In block 212, the focus process 200 may determine if the core disk having the smallest width is out of range. The smallest core disk width may be out of range, for example, if it is above a maximum allowable width. The minimum width core disk may also be considered out of range if the minimum core width was measured for a core image captured at or near one end of the focus setting sequence, as this could indicate that the best focus is outside the focusing range of the lens.

If the minimum core width is out of range (i.e., "YES" branch of decision block 212), the focus process 200 may return to block 202 and re-adjust the ferrule position before repeating the lens focus setting procedure. If the minimum core width is not out of range (i.e., "NO" branch of decision block 212), the focus process 200 may proceed to block 214.

Figure 14:
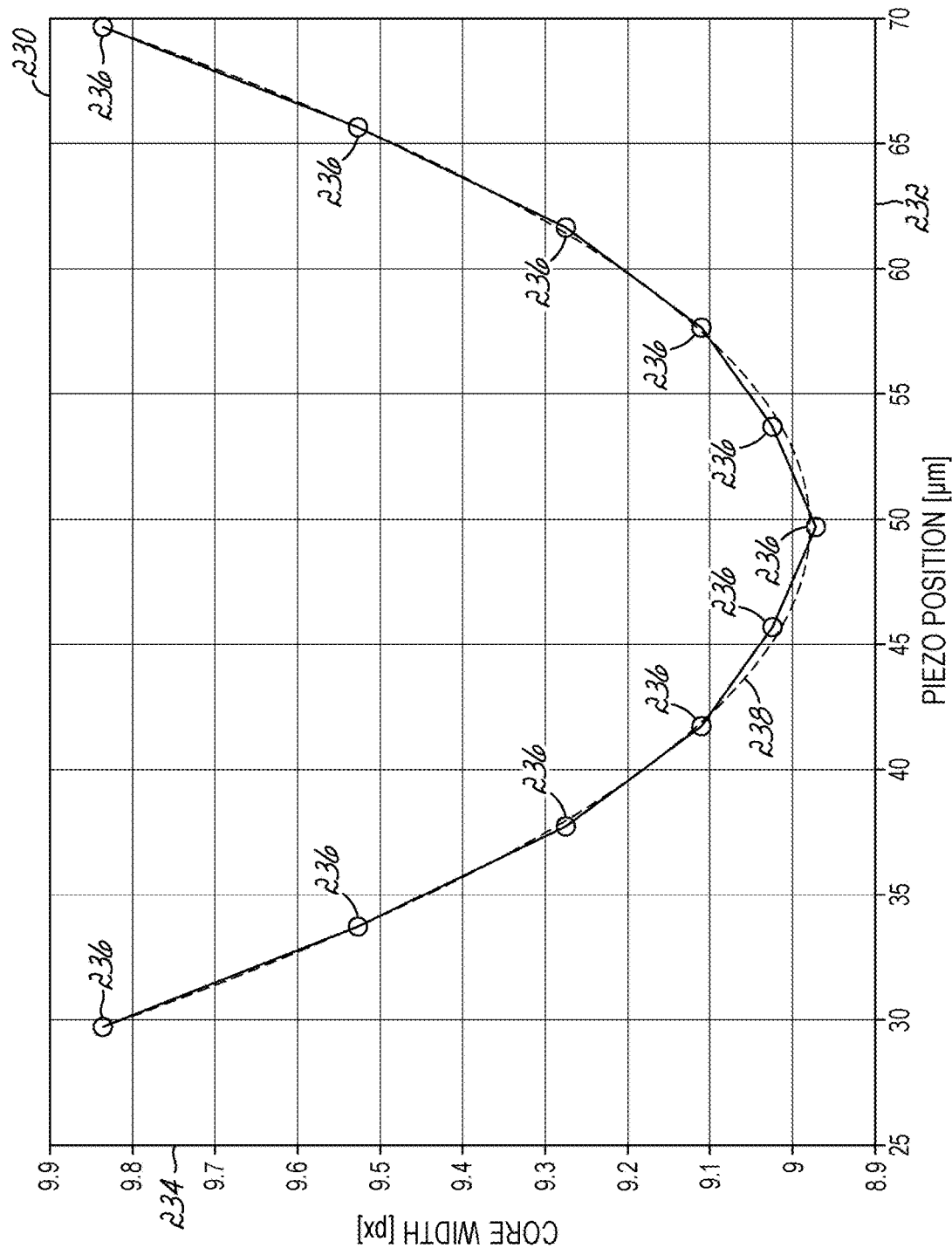
FIG. 14 is a graphical view of a core disk width verses lens position curve that may be used by the process of FIG. 13 to determine the position of best focus.

In block 214, the focus process 200 may determine the lens position setting (also referred to as lens focus setting) that provides the best focus. One way to determine the position of best focus may be to fit a curve (e.g., a polynomial curve) to the core disk width data. FIG. 14 depicts an exemplary graph 230 including a horizontal axis 232 corresponding to lens focus position (e.g., in μm) and a vertical axis 234 corresponding to a core disk width (e.g., in pixels). Markers 236 indicate the position of exemplary data points collected at each lens focus setting, and plot 238 depicts a curve (e.g. a parabola) which has been fitted to the data points to minimize an error (e.g., using a least squares error method). Once the curve has been fitted, the process 200 may determine the position of best focus as the position on the horizontal axis 232 corresponding to the minimum value of the curve. Advantageously, using curve fitting to find the position of best focus may allow the use of fewer data points 236, and may also improve accuracy of the best focus lens position.

Figure 15:
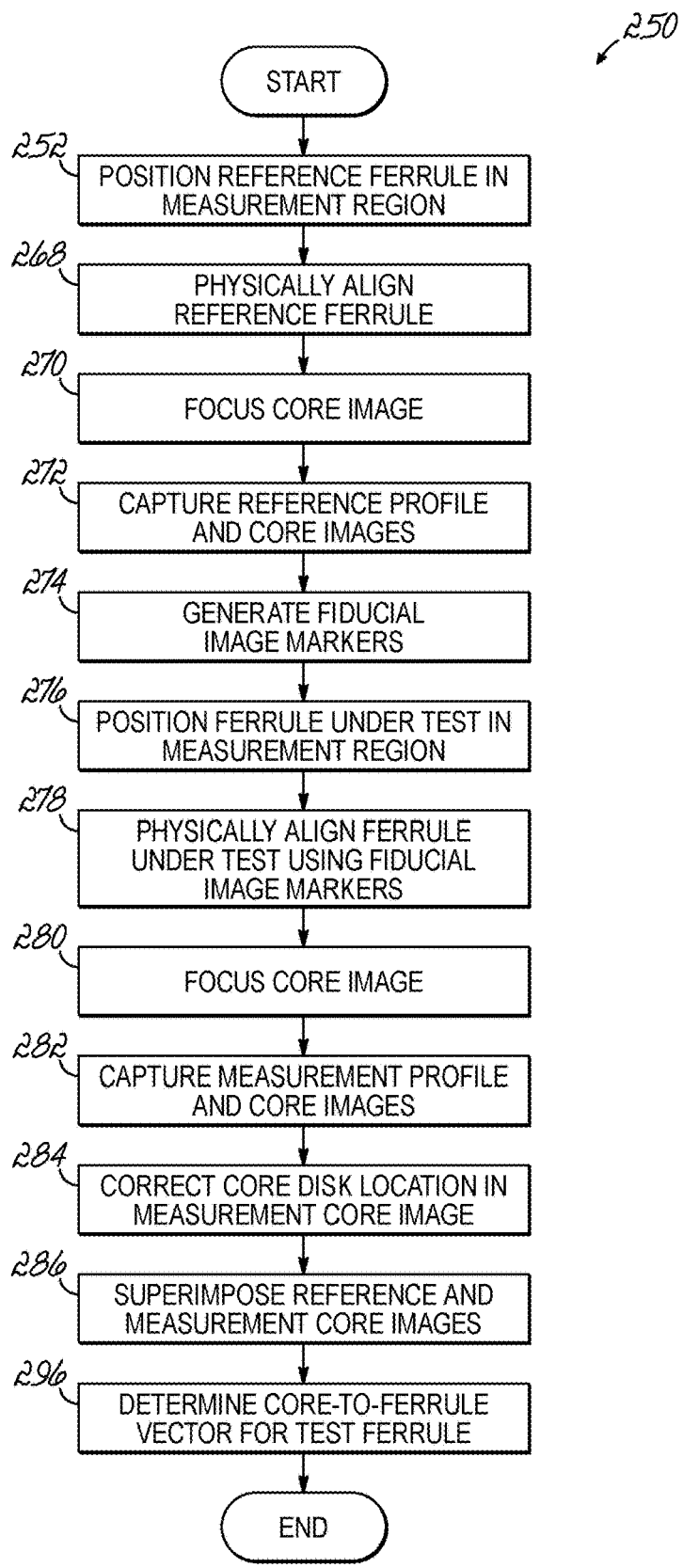
FIG. 15 is a flowchart of a process that may be used to determine a core-to-ferrule offset vector of a test ferrule based on a reference ferrule having a known core-to-ferrule offset vector.
Figure 16:
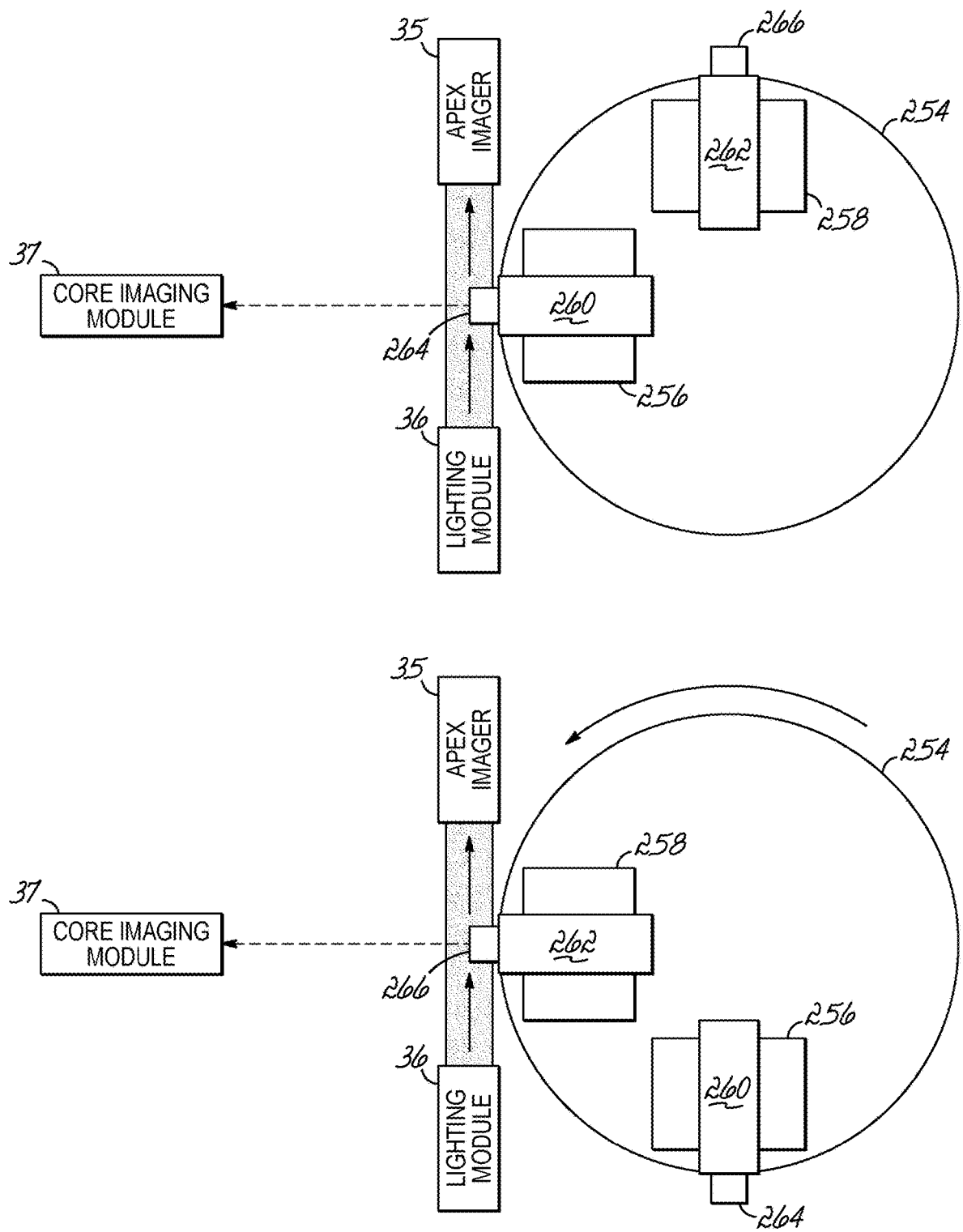
FIG. 16 is a diagrammatic view of a fixture that may be used to selectively position the reference and test ferrules in a measurement region of the measurement system of FIG. 1 during execution of the process of FIG. 15.

FIG. 15 depicts a flowchart illustrating a measurement process 250 for measuring the core-to-ferrule offset vector of a test ferrule, e.g., ferrule 14 of FIG. 1 or ferrule 170 of FIG. 12. In block 252, a reference ferrule having a known core-to-ferrule offset vector may be positioned in the measurement region 49 of measurement system 34. The reference core-to-ferrule offset vector may have been determined, for example, using the characterization process 100, or any other suitable process or system for determining the core-to-ferrule offset vector, such as the process and system disclosed in U.S. Pat. No. 9,612,177, the disclosure of which is incorporated by reference herein. The reference ferrule may be positioned in the measurement region 49 of measurement system 34 by inserting a connector including the reference ferrule into the measurement port 38, e.g., manually or with a robotic arm. Ferrules may also be moved into or out of the measurement region 49 by a fixture. For example, FIG. 16 depicts an exemplary fixture 254 including a plurality of measurement ports (e.g., two measurement ports 256, 258) each configured to receive a connector 260, 262 including a ferrule 264, 266. Moving (e.g., rotating) the fixture 254 may alternately place one ferrule 264 (e.g., a reference ferrule) or another ferrule 266 (e.g., a test ferrule) in the measurement region 49 of measurement system 34. Alternative embodiments may include fixtures (not shown) configured to receive connector sub-assemblies, such as ferrule assemblies only including a respective optical fiber terminated by a respective ferrule (and optionally a ferrule holder that received over a rear portion of the ferrule).

In response to receiving an indication the reference ferrule is positioned in the measurement region 49 (e.g., based on data received from a bar code scanner, at user interface of a computing device, etc.), the process 250 may proceed to block 268 and physically align the reference ferrule. Physical alignment of the reference ferrule may proceed essentially as described above with respect to reference characterization process 100. That is, the reference ferrule may be moved and rotated in a six-degree of movement reference frame (x, y, z, α, β, γ) until the profile edges are aligned with certain regions, pixels, or fiducial markers in the profile images. An edge may be considered aligned with a fiducial marker when it is within a predetermined distance and has a slope within a predetermined angle of the fiducial marker. In cases where the radius of the ferrule is larger or smaller than expected, profile edges may be aligned with their respective fluidical markers such that the offset is evenly distributed between each side of the ferrule.

Once the reference ferrule has been physically aligned, the measurement process may proceed to block 270 and focus the core image. Focusing the core image may proceed essentially as described above with respect to the focus process 200. That is, the reference ferrule may be physically positioned along the z-axis to achieve a rough focus, then the lens of core imager 37 sequentially moved through a set of focus positions while core images are captured, and the width of the core disk in the core images analyzed to determine the lens position providing the best focus.

In response to determining that the core image is focused, the process 250 may proceed to block 272 and capture at least one set of reference profile and core images. The reference images may be captured simultaneously and stored to memory. The measurement process 250 may then proceed to block 274, and generate reference fiducial markers based on the reference profile images.

In block 276, a ferrule to be tested ("test ferrule") may be positioned in the measurement region 49. As with the reference ferrule, placement may be automated, e.g., by moving the fixture or robotically placing a connector including the test ferrule into the measurement port 38. In response to receiving an indication the test ferrule is in place, the process 250 may proceed to block 278 and physically align the test ferrule. Physical alignment of the test ferrule may proceed in essentially the same manner as described with respect to reference characterization process 100. That is, the test ferrule may be moved and rotated in a six-degree of movement reference frame until the profile edges are aligned with the reference fiducial markers generated in block 274.

Once the test ferrule has been physically aligned, the measurement process may proceed to block 280 and focus the core image as described above with respect to the reference ferrule in block 272. In response to determining the core image is focused, the process 250 may proceed to block 282, and capture at least one set of measurement images including a plurality of measurement profile images and a measurement core image as described above with respect to the reference ferrule in block 274.

In block 284, the measurement process 250 may correct the location of the measurement core in the measurement core image. The correction process may include comparing the profile edges in the measurement profile images to the profile edges in the respective reference profile images. Core disk location corrections in the core image plane may then be determined based on the profile edge comparisons, e.g., as described above with respect to FIGS. 7-9. Once the core disk location corrections have been determined, the location of the core disk in the measurement core image may be corrected based thereon, e.g., by shifting the core disk by x and y-axis offsets denominated in pixels.

Figure 17:
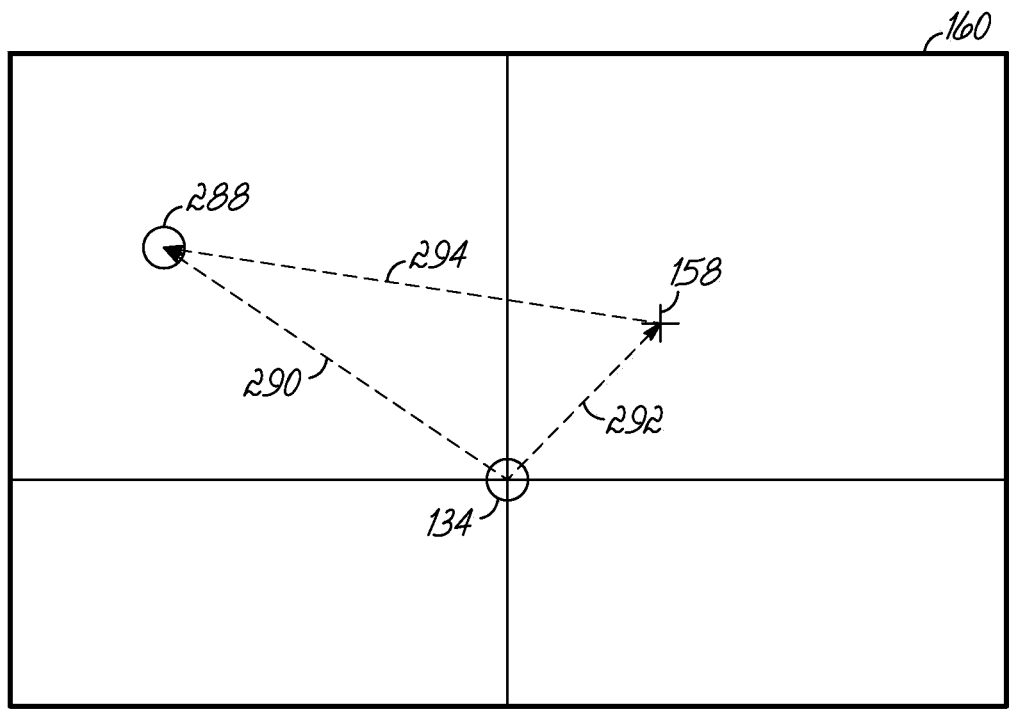
FIG. 17 is a diagrammatic view of the image of FIG. 11 showing a relationship between the core-to-ferrule offset vectors of the reference and test ferrules being analyzed by the process of FIG. 15.

Referring to FIG. 17, and with continued reference to FIG. 15, in block 286, the measurement process 250 may superimpose the corrected test core disk 288 from the measurement core image onto the reference core image 160. As can be seen, the vector 290 from the reference core disk 134 to the test core disk 288 is the sum of the vector 292 from the test core disk 134 to the center axis location 158 (i.e., $-\overrightarrow{CTF_{REF}}$) and the vector 294 from the center axis location 158 to the reference core disk 288 (i.e., $+\overrightarrow{CTF_{TEST}}$).

In block 296, the process 250 may determine the core-to-ferrule offset vector of the test ferrule based on the reference core image 160. The relationship between the vectors 290, 292, 294 may be written as:

$$\overrightarrow{CTF_{TEST}} - \overrightarrow{CTF_{REF}} = \overrightarrow{CTC_{REF\_TEST}} \qquad \text{Eqn.10}$$

where $\overrightarrow{CTF_{REF}}$ is the core-to-ferrule offset vector 162 of the reference ferrule (which may be known from the reference ferrule characterization process 100), $\overrightarrow{CTF_{TEST}}$ is the core-to-ferrule offset vector of the test ferrule (which may be yet to be determined), and $\overrightarrow{CTC_{REF\_TEST}}$ is the core-to-core vector from the test core disk 134 to the reference core disk 288 (which may be determined from the relative locations of the test and reference core disks in pixel coordinates). Thus, the core-to-ferrule offset vector of the test ferrule $\overrightarrow{CTF_{TEST}}$ can be determined by rearranging terms as follows:

$$\overrightarrow{CTF_{TEST}} = \overrightarrow{CTC_{REF\_TEST}} + \overrightarrow{CTF_{REF}} \qquad \text{Eqn. 11}$$

The above vectors may be in units of image pixels, which can be transformed into physical dimensions (e.g., μm at the end-face of the test ferrule) using the gain g of the core imager 37.

Core-to-ferrule measurements may at times need to cope with particulates on the surface of the ferrule. For example, particulates may perturb the edge finding algorithms that are used to sense the position of the ferrule based on the location of edges in the profile images. Thus, measurements may be vulnerable to "smudge" or the collection of larger particles on the ferrule, which can negatively impact measuring the position of the ferrule. The tangential imaging technique used by the measurement system 34 may enable analysis of an edge fit to a reference curve. Any perturbations from the fitted reference curve may be used to provide a cleanliness metric. The cleanliness metric may be used to identify and reject connectors that are contaminated, damaged, or otherwise compromised. This self-screening capability may be performed on every measurement, thereby significantly increasing the robustness of core-to-ferrule measurements in practice.

Figure 18:
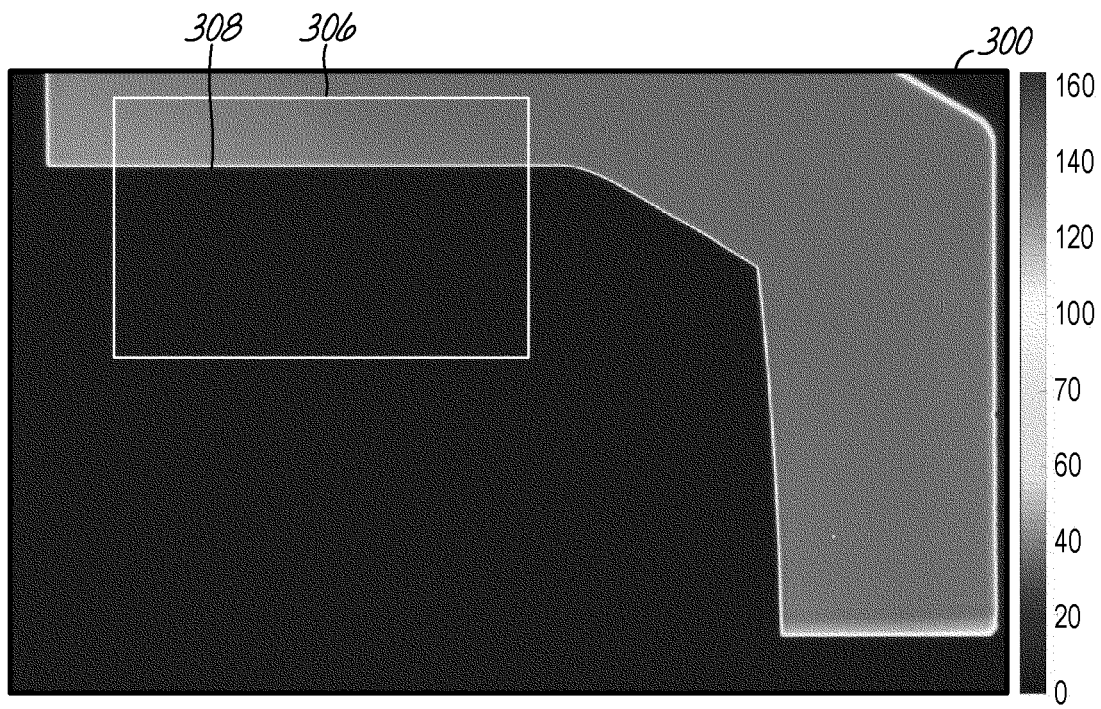
FIG. 18 is a diagrammatic view of a profile image showing a region of interest including a portion of an edge of a test ferrule.
Figure 19:
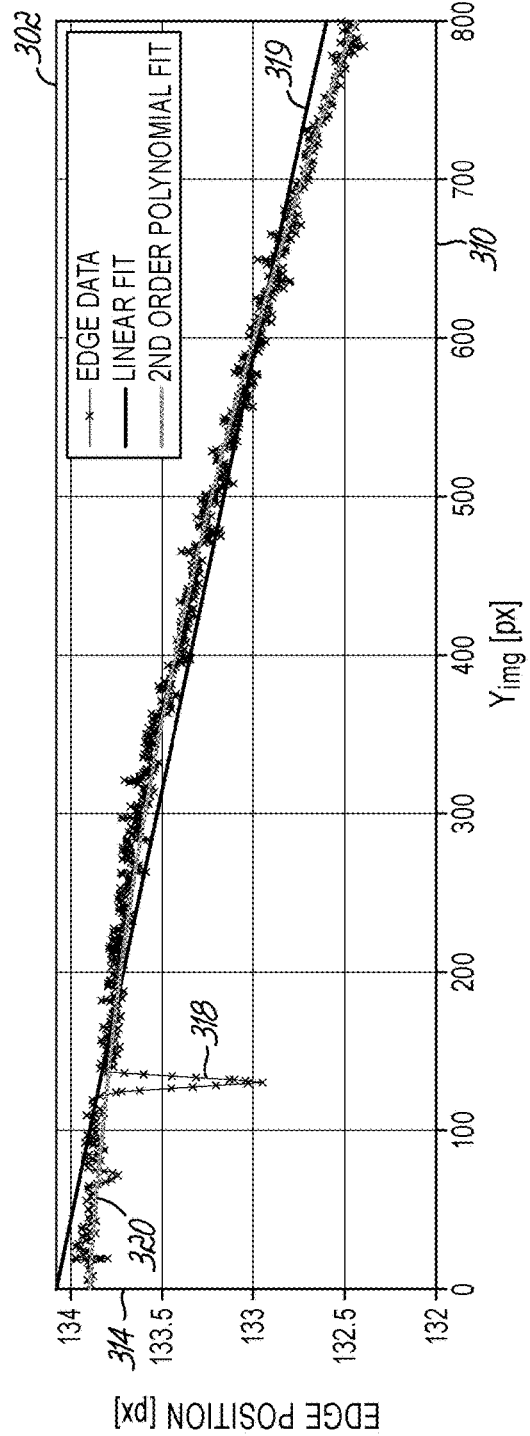
FIGS. 19 and 20 are graphical views of edge x-position and a fit residual verses y-position of the edge of FIG. 18 showing a fit residual that may be caused by contamination of the ferrule.
Figure 20:
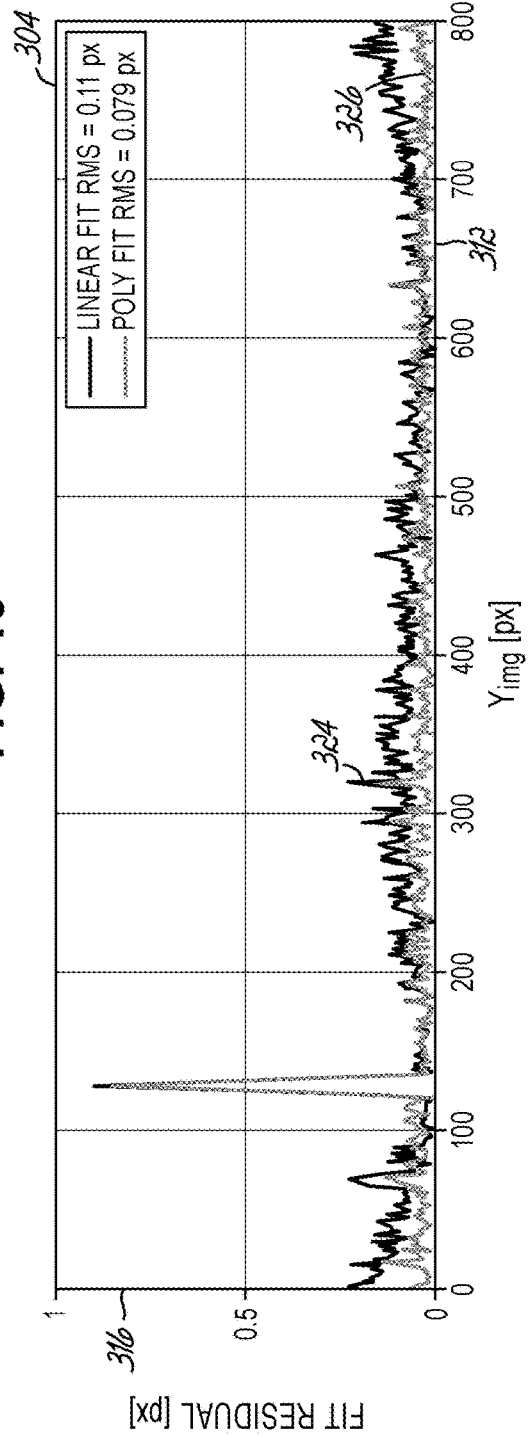

FIGS. 18-20 depict an exemplary profile image 300, edge position graph 302, and residual graph 304 for a ferrule which has been compromised, e.g., by a particle or scratch on the ferrule. The profile image 300 includes an exemplary region of interest 306 having dimensions of 500 by 800 pixels. The region of interest 306 includes a portion of an edge 308 corresponding to the outer surface of a ferrule. Each of the graphs 302, 304 includes a respective horizontal axis 310, 312 corresponding to a pixel location (e.g., in number of pixels from the left edge of the region of interest 306) along the portion of the edge 308. Graph 302 includes a vertical axis 314 corresponding the position of the edge 308 in pixels from the top of the region of interest 306. Graph 304 includes a vertical axis 316 corresponding to a fit residual in pixels. Plots 318-320 in graph 302 depict edge data, one reference curve having a linear fit to the edge data, and another reference curve having a second order polynomial fit of the edge data, respectively. The edge data may comprise, for example, coordinates of pixels in the profile image that define the location of the edge. Plot 324 of graph 304 depicts a residual curve determined by subtracting the edge data plot 318 from the linear fit reference curve 319. Plot 326 of graph 304 depicts another residual curve determined by subtracting the edge data plot 318 from the polynomial fit reference curve 320.

The outer surface of the ferrule appears smooth and continuous in the image 300. However, the residual curves 324, 326 reveal a particle or other defect in the form of a perturbation in the residual curve plots 324, 326 at the location of the particle. These types of edge residuals may provide a useful metric for validating the integrity of the measurement. For example, if the residual curve is higher than a predetermined threshold, the connector may be rejected, and the user asked to reclean the connector.

Advantageously, the optical collet and optical gauge block features enable the position of a ferrule to be determined in three-dimensional space without contacting the exposed ferrule end-face or cylindrical surfaces. The optical collet feature uses optics and controls to constrain the position of the ferrule, e.g., through lateral, angular, and axial alignment. Thus, the ferrule may be aligned by an "optical collet" through the use of image-based measurements, algorithms, and stage positioners. This offers tremendous advantages for achieving high precision measurement results as compared to conventional core-to-ferrule measurement systems that rely on mechanical contact to align the ferrule.

The above optical measurement features and attributes leverage the concept of relative measurements. Conventional systems use equipment that performs absolute core-to-ferrule measurements, typically by rotation. The use of a reference ferrule having a known core-to-ferrule offset vector enables precise core-to-ferrule measurements of test ferrules without rotation. Knowing the core-to-ferrule offset vector of the reference ferrule, and the relative shift in measurement data when both the reference and test connectors are sequentially measured, allows the absolute core-to-ferrule of the test connector to be determined without needing to rotate the connector relative to the measurement device. Advantageously, this comparative technique cancels out thermal drift, lens distortion, and other potentially error-inducing effects.

In addition, because measurements do not require contact with the reference ferrule, the reference ferrule does not suffer from the same disadvantages of conventional contact-based insertion loss measurements. Due to the lack of contact, the end-face regions of the reference ferrules do not experience wear or damage from repeated use. Thus, the reference ferrules have an indefinite lifetime, and may be shipped to multiple locations to enable multiple measurement devices to be calibration free. This is a significant benefit because relative measurements are more robust over time than absolute measurements that require periodic calibration. For at least this reason, the imaging techniques described herein can be used to perform core-to-ferrule measurements without the need for specialized thermal environments or constant recalibration. That is, a highly robust measurement can be made in a standard lab environment without additional environmental controls, such as active thermal regulation.

The image-based measurements described herein may be used to augment existing insertion loss tests. The robust nature of the above measurement techniques may allow precise measurements in adverse environments, such as a factory floor. Thus, the robustness of the measurements may enable performance of statistical quality control on-site. Systems and methods in accordance with the present disclosure may thereby enable manufacturing processes to be monitored and adjusted to keep quality metrics under control, and remove core-to-ferrule offset uncertainty from standard insertion loss measurements by enabling pre-screening of connector distributions.

Having the ability to pre-screen connectors may provide several advantages. For example, pre-screening could be used to numerically adjust results based on core-to-ferrule offset in order to quantify non-core-to-ferrule effects (i.e. sleeve quality issues). Pre-screening may also allow removal of connectors from distribution that have high core-to-ferrule offset in order to quantify non-core-to-ferrule effects.

Positioning multiple profile imaging channels radially around the 360 degree circumference of the cross-section of the ferrule and keeping the imager optical axes perpendicular to the center axis of ferrule may facilitate locating the center axis without the need to rotate the ferrule. In addition, because the imagers may image some length along the ferrule, determining the angle of the ferrule may also be facilitated.

Establishing the reference fiber-optic connector by measuring the core-to-ferrule offset at multiple rotation positions about the center axis of ferrule (e.g., eight rotation positions spaced 45-degrees apart, sometimes referred to as "octo-mode") may facilitate determining the absolute core-to-ferrule offset of the connector.

The core-to-ferrule measurement for a test connector may be made relative to a reference connector for which the absolute core-to-ferrule offset is already known. This feature may enable an absolute core-to-ferrule distance for a fiber-optic connector to be determined without the need to rotate the ferrule under test. By measuring differences between the test and reference connectors, the relative resolution of the measurement may be increased (i.e., the minimum resolvable differences may be reduced in size) as compared to systems lacking this feature.

The image of the fiber core end-face where the light beam is emitted may be kept in focus by an autofocusing mechanism that utilizes two motion axes in tandem. These axes may include a course primary axis that carries a fine secondary axis. The primary motion may position the end-face close to focus and stop so that the secondary motion can step finely through focus. Optimal focus may therefore be detected and achieved.

A reduction in measurement noise may be achieved by synchronizing apex imager captures of the ferrule with the core imager captures of the fiber core, to cancel common-mode events like high-frequency vibration.

Figure 21:
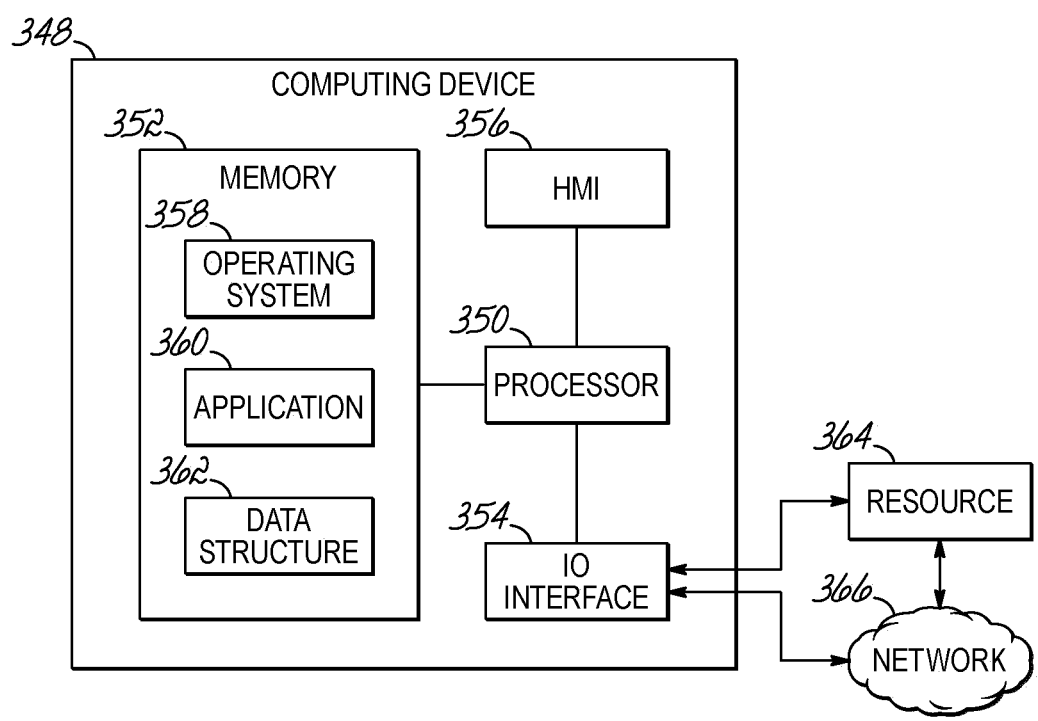
FIG. 21 is a schematic view of an exemplary computer that may be used to implement one or more of the features and attributes of FIGS. 1-20.

Referring now to FIG. 21, various features and attributes described herein may be implemented using one or more computer devices or systems, such as exemplary computer 348. The computer 348 may include a processor 350, a memory 352, an input/output (I/O) interface 354, and a Human Machine Interface (HMI) 356. The processor 350 may include one or more devices that manipulate signals or data based on operational instructions stored in memory 352. Memory 352 may include a one or more devices configured to store information in the form of digital data.

The processor 350 may operate under the control of an operating system 358 that resides in memory 352. The operating system 358 may manage computer resources so that computer program code embodied as one or more computer software applications 360 residing in memory 352 can have instructions executed by the processor 350. One or more data structures 362 may also reside in memory 352, and may be used by the processor 350, operating system 358, or application 360 to store or manipulate data.

The I/O interface 354 may provide a machine interface that operatively couples the processor 350 to other devices and systems, such as the profile imaging modules 35, profile light source 36, core imager 37, positioner 40, and core light source 42. The application 360 may thereby work cooperatively with the other devices and systems by communicating via the I/O interface 354 to provide any of the features described herein or their equivalents. The application 360 may also have program code that is executed by one or more external resources, or otherwise rely on functions or signals provided by other system or network components external to the system controller 44. Indeed, given the nearly endless hardware and software configurations possible, persons having ordinary skill in the art will understand that embodiments may include applications that are located externally to the computer 348, distributed among multiple computers or other external resources, or provided by computing resources (hardware and software) that are provided as a service over a network, such as a cloud computing service.

The HMI 356 may be operatively coupled to the processor 350 to allow a user to interact directly with the computer 350. The HMI 356 may include video or alphanumeric displays, a touch screen, a speaker, and any other suitable audio and visual indicators capable of providing data to the user. The HMI 356 may also include input devices and controls such as an alphanumeric keyboard, a pointing device, keypads, pushbuttons, control knobs, microphones, etc., capable of accepting commands or input from the user and transmitting the entered input to the processor 350.

The computer 348 may also be operatively coupled to one or more external resources 364, e.g., via a communication network 366. External resources may include, but are not limited to, servers, databases, mass storage devices, peripheral devices, cloud-based network services, or any other resource that may be used by the computer 348 to implement any of the features described herein or their equivalents.

In general, the routines executed to implement the features and attributes described herein, or their equivalents, may be referred to as "computer program code," or simply "program code." Program code typically comprises computer-readable instructions that are resident at various times in various memory and storage devices in a computer and that, when read and executed by one or more processors in a computer, cause that computer to perform the operations necessary to execute the various features and attributes of the described embodiments. Computer-readable program instructions for carrying out these operations may be, for example, assembly language, source code, or object code written in any combination of one or more programming languages. Program code is capable of being individually or collectively distributed as a computer program product in a variety of different forms. In particular, program code may be distributed using a computer-readable storage medium having computer-readable program instructions thereon for causing a processor to carry out aspects of the features and attributes described herein.

Computer-readable storage media, which is inherently non-transitory, may include volatile and non-volatile, and removable and non-removable tangible media implemented in any method or technology for storage of data, such as computer-readable instructions, data structures, program modules, or other data. A computer-readable storage medium should not be construed as transitory signals per se (e.g., radio waves or other propagating electromagnetic signals). Computer-readable program instructions may be downloaded to a computer, another type of programmable data processing apparatus, or another device from a computer-readable storage medium or to an external computer or external storage device via a network.

The flowcharts and block diagrams depicted in the figures illustrate features and attributes of possible implementations of systems, methods, or computer program products according to various disclosed embodiments and their equivalents. In this regard, each block in a flowchart or block diagram may represent a module, segment, or portion of instructions, which comprises one or more executable instructions for implementing the specified logical function or functions. In certain alternative embodiments, the functions or operations specified in the text or drawings of the specification may be re-ordered, processed serially, or processed concurrently consistent with embodiments thereof. Moreover, any of the flowcharts or block diagrams may include more or fewer blocks than those illustrated consistent with embodiments thereof. It should also be understood that each block of the block diagrams or flowcharts, or any combination of blocks in the block diagrams or flowcharts, may be implemented by a special purpose hardware-based system configured to perform the specified functions, or carried out by a combination of special purpose hardware and computer instructions.

The terminology used herein is for the purpose of describing particular embodiments only and is not intended to be limiting of other embodiments. As used herein, the singular forms "a", "an" and "the" are intended to include both the singular and plural forms, and the terms "and" and "or" are each intended to include both alternative and conjunctive combinations, unless the context clearly indicates otherwise. It will be further understood that the terms "comprises" or "comprising," when used in this specification, specify the presence of stated features, but do not preclude the presence or addition of one or more other features, or groups thereof. Furthermore, to the extent that the terms "includes", "having", "has", "with", "comprised of", or variants thereof are used in either the detailed description or the claims, such terms are intended to be inclusive in a manner similar to the term "comprising".

While the present disclosure includes the description of specific embodiments, and while these embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The claims in their broader aspects are therefore not limited to the specific details, representative apparatus and methods and illustrative examples shown and described. Accordingly, departures may be made from such details without departing from the scope of the present disclosure.

What is claimed is:

1. A method of focusing a core image of a test ferrule that has an optical fiber coupled thereto, wherein the optical fiber includes a core for the core image, the method comprising:
    positioning the test ferrule relative to a core imager including an optical sensor and a lens to achieve a rough focus of an image element in the core image;
    positioning the lens of the core imager at each of a plurality of lens focus settings each corresponding to a different position of the lens in the core imager relative to the optical sensor of the core imager;
    at each of the plurality of lens focus settings:
        capturing another core image including the image element, and
        determining a width of the image element in the core image;
    identifying the lens focus setting having a smallest width of the image element; and
    setting the position of the lens in the core imager to the lens focus setting having the smallest width.

2. The method of claim 1, wherein identifying the lens focus setting having the smallest width of the image element comprises:
    plotting the width of each image element verses the lens focus setting;
    fitting the plotted widths to a curve; and
    identifying a minimum of the curve as the lens focus setting having the smallest width.

3. The method of claim 2, wherein the curve is a polynomial curve.

4. The method of claim 3, wherein the curve is a parabola.

5. The method of claim 1, wherein determining the width of the image element comprises:
    fitting a Gaussian function to the image element;
    determining a standard deviation of the fitted Gaussian function; and
    determining the width of the image element based on the standard deviation.

6. The method of claim 5, wherein the width of the image element is twice the standard deviation.

7. The method of claim 1, further comprising:
    comparing the smallest width of the image element to a maximum allowable width;
    in response to the smallest width of the image element exceeding the maximum allowable width:
        repositioning the test ferrule; and
        repeating the positioning the lens, the capturing another core image, the determining the width of the image element, the identifying the lens focus setting, and the setting the position of the lens steps.

8. A system for focusing a core image of a test ferrule that has an optical fiber coupled thereto, wherein the optical fiber includes a core for the core image, the system comprising:
    a core imager including an optical sensor and a lens having a lens focus setting corresponding to a position of the lens in the core imager relative to the optical sensor of the core imager;
    a positioner configured to position the test ferrule relative to the core imager;
    one or more processors in communication with the core imager and the positioner; and
    a memory coupled to the one or more processors and including program code that, when executed by the one or more processors, causes the system to:
    position the test ferrule relative to the core imager to achieve a rough focus of an image element in the core image;
    position the lens of the core imager at each of a plurality of lens focus settings each corresponding to a different position of the lens in the core imager relative to the optical sensor of the core imager;
    at each of the plurality of lens focus settings:
        capture another core image including the image element, and
        determine a width of the image element of the core image;
    identify the lens focus setting having a smallest width of the image element; and
    set the position of the lens in the core imager to the lens focus setting having the smallest width.

9. The system of claim 8, wherein the program code causes the system to identify the lens focus setting having the smallest width of the image element by:
    plotting the width of each image element verses the lens focus setting;
    fitting the plotted widths to a curve; and
    identifying a minimum of the curve as the lens focus setting having the smallest width.

10. The system of claim 9, wherein the curve is a polynomial curve.

11. The system of claim 10, wherein the polynomial curve is a parabola.

12. The system of claim 8, wherein the program code causes the system to determine the width of the image element by:
    fitting a Gaussian function to the image element;
    determining a standard deviation of the fitted Gaussian function; and
    determining the width of the image element based on the standard deviation.

13. The system of claim 12, wherein the width of the image element is twice the standard deviation.

14. The system of claim 8, wherein the program code further causes the system to:
    compare the smallest width of the image element to a maximum allowable width;
    in response to the smallest width of the image element exceeding the maximum allowable width:
        reposition the test ferrule; and
        repeat the positioning the lens, the capturing another core image, the determining the width of the image element, the identifying the lens focus setting, and the setting the position of the lens steps.

15. A computer program product for focusing a core image of a test ferrule that has an optical fiber coupled thereto, wherein the optical fiber includes a core for the core image, the computer program product comprising:
    a non-transitory computer-readable storage medium; and program code stored on the non-transitory computer-readable storage medium that, when executed by one or more processors, causes the one or more processors to:
position the test ferrule relative to a core imager including an optical sensor and a lens to achieve a rough focus of an image element in the core image;
positioning the lens of the core imager at each of a plurality of lens focus settings each corresponding to a different position of the lens in the core imager relative to the optical sensor of the core imager;
at each of the plurality of lens focus settings:
  capture another core image including the image element, and
  determine a width of the image element of the core image;
identify the lens focus setting having a smallest width of the image element; and
set the position of the lens to the lens focus setting in the core imager having the smallest width.

* * * * *